(12) United States Patent
Smith

(10) Patent No.: US 7,664,041 B2
(45) Date of Patent: Feb. 16, 2010

(54) DISTRIBUTED STREAM ANALYSIS USING GENERAL PURPOSE PROCESSORS

(76) Inventor: Dale Trenton Smith, 612 Mindy Way, San Jose, CA (US) 95123

( * ) Notice: Subject to any disclaimer, the term of this patent is extended or adjusted under 35 U.S.C. 154(b) by 697 days.

(21) Appl. No.: 11/138,600

(22) Filed: May 26, 2005

(65) Prior Publication Data

US 2006/0271823 A1 Nov. 30, 2006

(51) Int. Cl.
*H04L 1/00* (2006.01)
(52) U.S. Cl. .................................. 370/241; 370/254
(58) Field of Classification Search .................. 370/241, 370/542, 254; 709/223, 224
See application file for complete search history.

(56) References Cited

U.S. PATENT DOCUMENTS

| | | | | |
|---|---|---|---|---|
| 5,404,352 A | * | 4/1995 | Pauwels et al. | 370/390 |
| 5,535,193 A | * | 7/1996 | Zhang et al. | 370/253 |
| 6,141,686 A | * | 10/2000 | Jackowski et al. | 709/224 |
| 6,526,044 B1 | * | 2/2003 | Cookmeyer et al. | 370/352 |
| 6,754,181 B1 | | 6/2004 | Elliott et al. | |
| 7,251,685 B1 | * | 7/2007 | Yildiz | 709/221 |
| 7,362,761 B2 | * | 4/2008 | Suzuki et al. | 370/394 |
| 7,385,924 B1 | * | 6/2008 | Riddle | 370/235 |
| 2003/0126297 A1 | * | 7/2003 | Olarig et al. | 709/250 |
| 2004/0057389 A1 | | 3/2004 | Klotz et al. | |
| 2004/0064351 A1 | | 4/2004 | Mikurak | |
| 2004/0172467 A1 | * | 9/2004 | Wechter et al. | 709/224 |
| 2004/0210654 A1 | | 10/2004 | Hrastar | |
| 2004/0225972 A1 | | 11/2004 | Oeltjen et al. | |

OTHER PUBLICATIONS

*Finisar's GTX Product Line Offers Complete & Accurate Analysis*, Copyright 2002 Finisar Corporation (4 pages).
*Protocol Knowledgeable GT-B Bit Error Rate Test System and Gigabit-Rate Physical Layer Verification System*, Finisar Corporation Dec. 2000 (4 pages).
*GTX-SANMetrics Fibre Channel & GigE/iSCSI Debug & Analysis Tool*, Finisar (4 pages), 2002.
*Transmeta Efficeon TM8600 Processor*, Transmeta Corporation, Jun. 2003, (2 pages).
*NP-1c Network Processor 10-Gigabit 7-Layer Network Processor with Integrated Search Engines*, http://www.ezchip.com/html/pr_np-1c.html printed Dec. 2, 2004 (5 pages).
*Implementing Layer 4-7 Switches Using the NP-1c Network Processor*, EZchip Technologies Ltd., Feb. 17, 2004 (6 pages).
*What is Programmable Logic?* Copyright 1994-2004 Xilinx, Inc. http://www.xilinx.com/company/about/programmable.html printed Dec. 17, 2004 (3 pages).

* cited by examiner

*Primary Examiner*—Ian N Moore
*Assistant Examiner*—Peter Cheng

(57) ABSTRACT

Methods and apparatuses for directing data transferred in a network to multiple analysis processors for network analysis processing. A network processor is configured to receive network data transferred in a network link. The network processor is configured to transmit the network data and a path control signal to a distribution module coupled to the network processor. The distribution module is configured to receive the path control signal and receive the network data from the network processor. The distribution module is further configured to route the network data to multiple outputs based on the path control signal received. A plurality of analysis processors are coupled to the distribution module for receiving the network data from a different output of the distribution module. Each analysis processor analyzes the network data received by the analysis processor for errors, purposes of detecting or measuring errors, performance, security, compliance, statistics, or patterns.

17 Claims, 24 Drawing Sheets

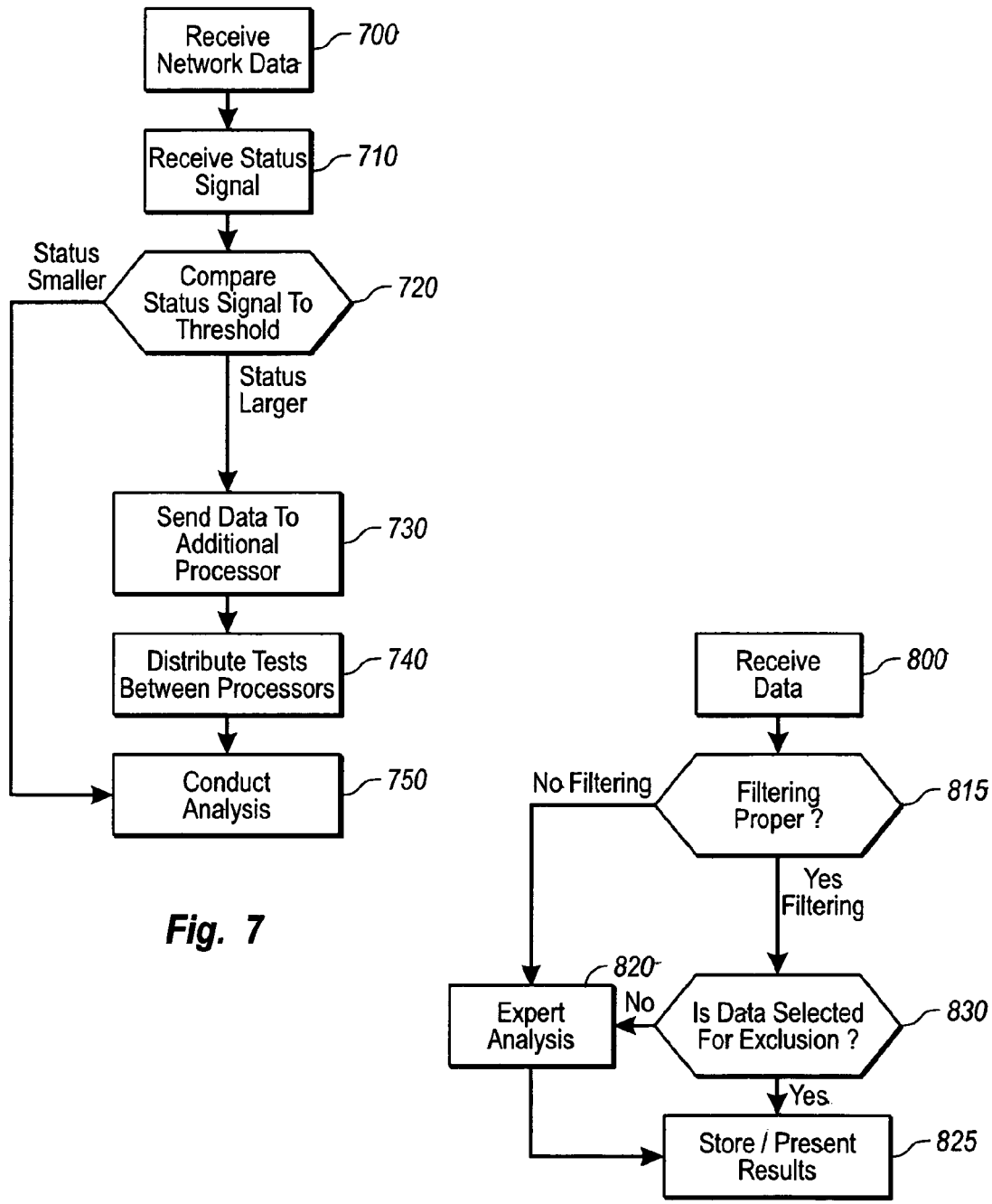

1300-

| | Test Description | Pass | Fail | None Observed |
|---|---|---|---|---|
| 1 | Cross Port Latencyout Of Bounds | X | | |
| 2 | Out Of Order Frame By Scr/dst | X | | |
| 3 | Out Of Order Frame In Network | X | | |
| 4 | Number Of Pending Frames Out Of Bounds | X | | |
| 5 | EOF Modified By Source Point | X | | |
| 6 | Cross Port Path Found | X | | |
| 7 | OPN/CLS Without Frame Transmission | | X | |
| 8 | Code Violation | | X | |
| 9 | Loss Of Sync | | | X |
| 10 | Unframed Data | | | X |
| 11 | Link Reset (NOS) | X | | |
| 12 | OPN Ended By Destination | X | | |
| 13 | Time In Transfer Mode Out Of Bounds | X | | |
| 14 | % Of Arbitration Losses Out Of Bounds | | X | |
| 15 | Link Credit Reset (LR) | | | X |
| 16 | Frame To R_RDY Time Out Of Bounds | | | X |
| 17 | Link Reset (LIP) | | | X |
| 18 | % Of Abnormal Tenacies Out Of Bounds | | X | |
| 19 | % Of Out Of Credit Out Of Bounds | X | | |
| 20 | Credit Offset Out Of Bounds | X | | |
| 21 | Short Link Reset | X | | |
| 22 | Link Credit Reset Response (LRR) | | | X |
| 23 | Link Reset (OLS) | | | X |
| 24 | Arbitration Loss By Device | X | | |

*Fig. 13*

DISTRIBUTED STREAM ANALYSIS USING GENERAL PURPOSE PROCESSORS

CROSS-REFERENCE TO RELATED APPLICATIONS

Not applicable.

BACKGROUND OF THE INVENTION

1. The Field of the Invention

The present invention relates generally to analysis of data transmitted over a communication link. More specifically, the present invention relates to the distributed analysis of network data transmitted at a high rate of speed using multiple processors.

2. The Relevant Technology

Many data communications systems use a variety of different transmission mechanisms to enable communication between and among associated subsystems. In general, the type of transmission mechanism employed in a given situation is determined with reference to the particular tasks desired to be accomplished in connection with those transmission mechanisms and associated systems. In turn, each transmission mechanism is associated with a particular transmission, or communication, protocol that defines various parameters concerning the transmission of data in connection with the transmission mechanism. Such communication protocols commonly specify, for example, the manner in which data is encoded onto a transmission signal, the particular physical transmission media to be used with the transmission mechanism, link layers, and other attributes concerning the transmission of data.

As network data moves from a point of origin to a destination by way of communication links, the network data passes through a variety of devices collectively representing multiple protocols and types of hardware. Typically, each device modifies the network data so that the network data can be transmitted by way of a particular communication link. However, modification of the network data in this manner often causes errors or other problems with the network data. Such errors may occur as the result of various other processes and conditions in the transmission mechanisms as well. Thus, the various links in a communications system may be particularly prone to introduce, or contribute to the introduction of errors in the network data. Moreover, errors and other problems present at one location in the network data stream can cause additional errors or other problems to occur at other locations in the network data stream and/or at other points in the communications system and associated links.

One approach to the identification, analysis, and resolution of problems in communications systems involves capturing a portion of the network data traffic for review and analysis. In some cases, such data capture is performed in connection with an analyzer that includes various hardware and software elements configured to capture data from communications links in the communications system, and to present the captured data in various formats to a user or technician by way of a graphical user interface or other output device.

Generally, such analyzers capture data traffic in the communications system over a defined period of time, or in connection with the occurrence of predefined events. Use of the analyzer can allow a network administrator to track the progress of selected data as that data moves across the various links in the communications system. Corrupted or altered data can then be identified and traced to the problem link(s), or other parts of the communications system. Analyzers can provide useful results, but it is often the case that employment of typical protocol analyzers imposes unacceptable costs in terms of communications system performance and down time. Often, analyzers have also been unable to increase processing speeds to match the increasing rates of data transfer.

Errors in a communication link can occur at various layers of hardware and software. Ideally, it is preferred to conduct analysis of every layer to detect such errors. Example layers of analysis include the physical layer, the packet layer, the command layer, the application layer, and the network layer. Several different analysis tools have been produced to analyze network data so as to detect errors at these different layers of processing. However, analyzers have generally been limited in the number of layers and the amount of data that can be analyzed.

In addition, at one level of intelligence an analysis tool may be able to decode an event and present the decoded event to a user or technician. Above this level of analysis intelligence is an analysis tool that looks at a string of data events that occur over seconds or minutes of time and intelligently analyzes the network data to explain what is occurring at a higher level. This may include checking large sequences of packets and primitives using different algorithms and tests to insure that each protocol and application was followed correctly.

Another level of analysis intelligence includes the ability for an analyzer to look at a higher level of a data communication system and make sense of the large amount of data transmitted so that the analyzer can indicate to the user or technician what went wrong and also provide instructions to the user or technician for fixing the problem. However, as these levels of analysis intelligence increase, the amount of data processing power required to perform the analysis also increases.

Another problem with looking at these higher layers is that there can be several packets of data making up a transaction between a source and a destination. These data packets can be interleaved with other packets of data from different network transactions (e.g., between different sources and destinations). Thus, to analyze a specific network transaction, an analyzer must first receive, identify, and associate the different packets from each transaction in order to apply algorithms and other checks to the entire transaction. This becomes even more difficult for a processor to accomplish as the rate of data transmission, number of network transactions, and amount of data in each transaction increases.

BRIEF SUMMARY OF THE INVENTION

The present invention relates to distributed analysis of network data. According to an embodiment of the present invention, a network analyzer for analyzing data transferred in a network can include a network processor configured to receive network data representing at least a portion of a data stream transferred in a network link, wherein the network processor prepares the network data for analysis and associates an identifier with one or more portions of the network data. The network analyzer can further include a distribution module coupled to the network processor and configured to receive the network data from the network processor, the distribution module configured to route the network data to at least one of a plurality of distribution module outputs based on the identifier of the one or more portions of the network data or based on a path control signal generated by the network processor. The Network analyzer can further include a plurality of analysis processors coupled to the distribution module, each analysis processor coupled to a different output of the distribution module for receiving the network data from a different output of the distribution module, each analysis processor performing analysis specific portions of the network data.

According to an embodiment of the present invention, a method for analyzing network data in a network analysis can include receiving network data representing at least a portion of a data stream transmitted in a network link at a network processor, extracting identification information from the network data with the network processor, assigning the network data to a plurality of analysis processors by including an identifier in one or more portions of the network data, and routing the network data to the assigned analysis processors for analysis such that each portion of the network data with the same identifier is routed to the same analysis processor.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 7 is a block diagram illustration of a method for analyzing data according to an example embodiment of the present invention;

FIG. 8 is a flow diagram illustrating a method for analyzing a network data stream implementing filtering techniques according to an example embodiment of the present invention;

FIG. 13 depicts an example priority look-up-table (LUT) listing a variety of tests and analysis algorithms that can be conducted on a transaction or data stream;

DETAILED DESCRIPTION OF THE PREFERRED EMBODIMENTS

The present invention is directed toward the distributed analysis of data in high speed data transmission systems. The principles of the present invention are described with reference to the attached drawings to illustrate the structure and operation of example embodiments used to implement the present invention. Using the diagrams and description in this manner to present the invention should not be construed as limiting its scope. Additional features and advantages of the invention will in part be obvious from the description, including the claims, or may be learned by the practice of the invention. Descriptions of well-known components and processing techniques are omitted so as not to unnecessarily obscure the invention in detail.

Figure 1:
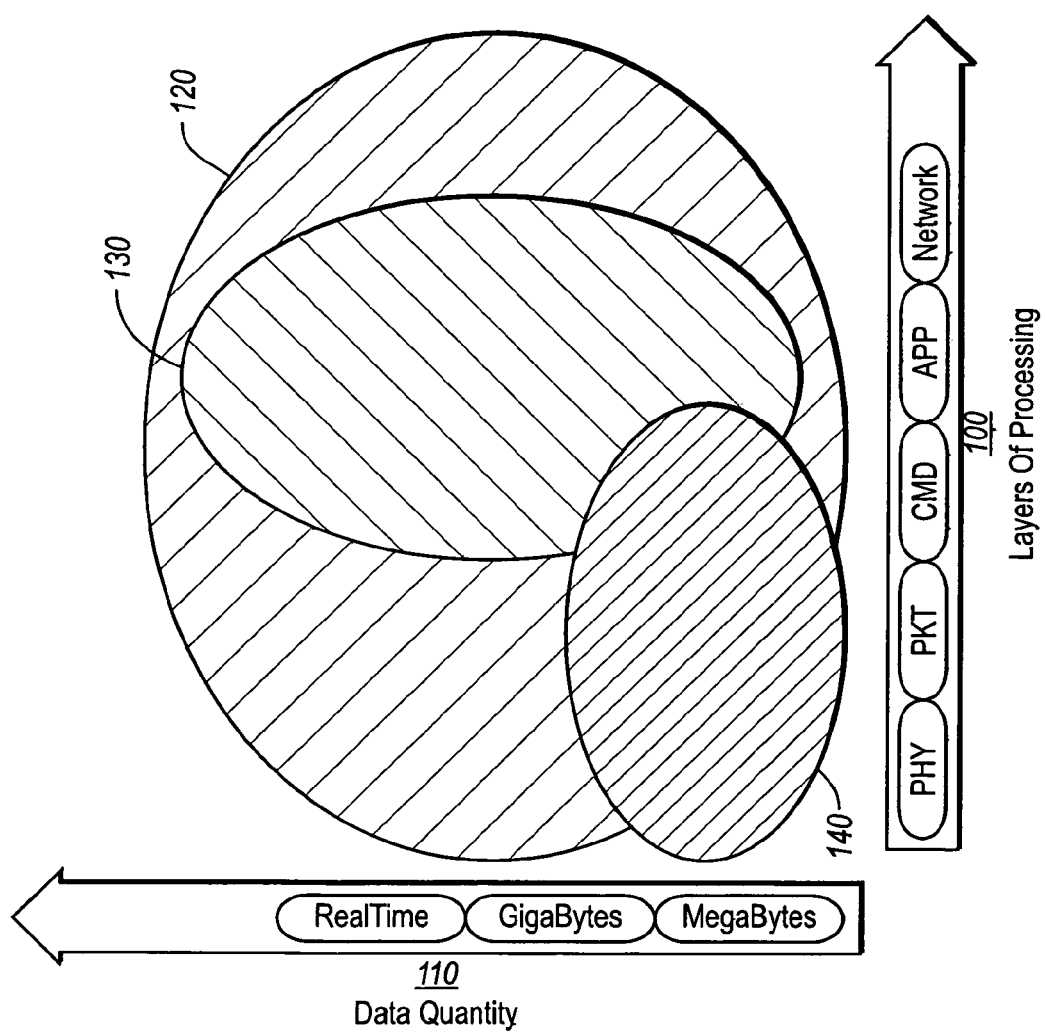
FIG. 1 illustrates example layers of network processing versus relative quantities of data required for the network analysis.

An apparatus for analyzing a data stream can analyze a variety of different layers of the network data transmission to locate errors caused by different mechanisms and processes. FIG. 1 depicts example layers of processing 100 versus relative quantities of data required for analysis 110. An analysis tool can perform analysis at several different layers 100 of a transmitted data stream that may require analysis of several different quantities of data 110 for analysis. For example, one analysis tool 140 might look at the physical and packet layers of a data transmission, while another analysis tool 130 might look at the command and application layers.

Different layers 100 may identify errors in different mechanisms and processes of a network. For example, the physical layer (PHY) may address hardware errors that are associated with electronic signals. The packet layer (PKT) may be more directed toward errors in both hardware and firmware mechanisms and processes. The command layer (CMD) may be more directed toward detecting errors in groups of packets of data and operating system errors. An application layer (APP) may be more concerned with detecting errors at the application protocol level and more intelligent interpretation of data may be required. Finally, at the network layer (NETWORK) there are applications and links working simultaneously and effects may not be readily identifiable at the cause of the error, and an error may need to be traced from where it is identified to the location of its cause.

In order to analyze a data stream at a higher layer, a larger portion of the network data stream may need to be analyzed at one time. For example, to analyze a data stream at the physical and packet layer, only a single packet may need to be analyzed at a time. However, at the command, application, and network layers, multiple packets of data related to entire transactions may need to be analyzed at a time to detect errors. A transaction can be defined as a task, exchange, or command involving one or more packet transmissions. To achieve analysis of such higher layers often requires additional processing requiring additional processing power. Some embodiments of the invention relate to apparatuses and methods for expert data analysis of one or more layers for errors at, or approaching, real-time speed. Real-time speed can be defined as a speed that can keep up with the incoming traffic indefinitely in a controlled manner without skipping portions of the network data in order to catch up. Some embodiments of the present invention can operate at, or near, real-time speed.

Some embodiments of the present invention also relate to performing analysis of network data at various layers of analysis. The term 'network data' refers to a transmission, packet, primitive, data, and any other information transferred in a communications link, data link, wireless link, optical link, copper link, Fibre channel link, Ethernet link, or other link of a data or communications system. For example, some advantageous aspects of the present application that can be combined in several different configurations, sequences, and accomplished using a variety of apparatuses and processes include: (1) demultiplexing of network data so that the network data can be directed to and/or analyzed by multiple analysis processors, (2) distributing a piece of network data, or portions of network data, across multiple processors for network analysis, (3) filtering network data so as to reduce the amount of processing power required by excluding network data such as repetitive data or data with known analysis results from further analysis, (4) prioritizing different analysis tests and algorithms so that less critical tests, tests that have already been conducted, tests with known results, and/or other tests can be excluded for the sake of more critical tests, and (5) scaling various aspects of the present invention so as to remove bottlenecks in network analysis apparatuses.

1. Demultiplexing Network Data for Analysis

Figure 2A:
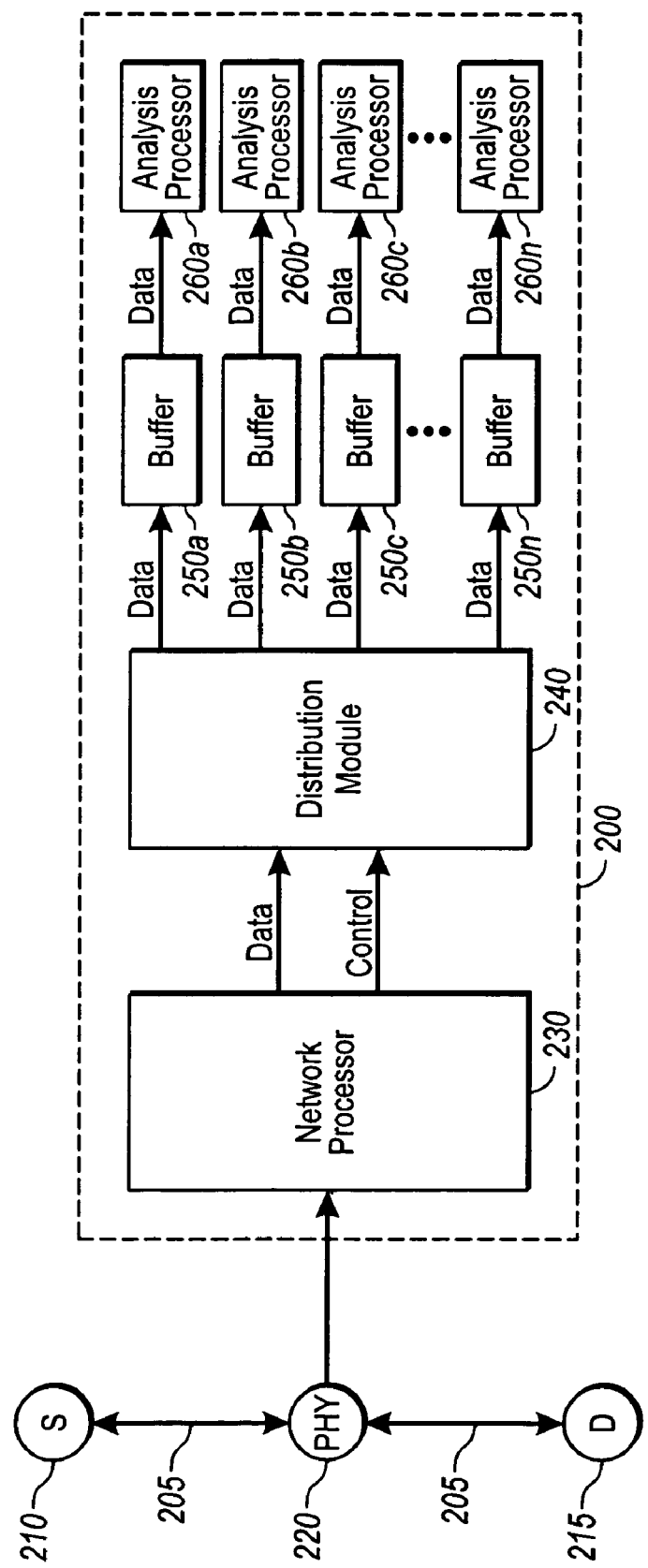
FIG. 2A illustrates a system for demultiplexing and analyzing a network data stream according to an example embodiment of the present invention.

Referring now to FIG. 2A, a system 200 for demultiplexing and analyzing a network data stream is shown according to an example embodiment of the present invention. The system 200 for demultiplexing and analyzing a data stream can be placed at any point along a transmission link 205 between a data transmission source 210 and a data transmission destination 215. A communication system including the source 210 and the destination 215 can comprise a variety of different communication links, systems, and devices conforming to any number of different communication protocols.

The signals transmitted between the source 210 and destination 215 can be received by the analyzer 200 using a physical connection 220 coupled to the transmission link 205. The physical connection 220 can include a tapping apparatus that allows the network data stream to continue on to the destination component 215 without disrupting the transmission of data. Use and manufacture of tapping apparatuses are generally well known to one of ordinary skill in the art and any appropriate tapping device can be used according to the present invention.

The physical connection 220 can be part of the network analysis system 200 depicted in FIG. 2, or can be part of any of the embodiments of the present invention described herein. The physical connection 220 may also be a separate distinct apparatus coupled to embodiments of the present invention in an appropriate manner (e.g., as shown in FIG. 2) to provide network data for analysis. The physical connection 220 can produce a copy of at least a portion of the network data stream and forward the copy representing at least a portion of the network data stream to the analysis system 200 without disrupting the transmission of data between the source 210 and destination 215. The copy of the network data stream can then be routed to any of several analysis processors 260*a-n* for analysis of the mechanisms and processes involved in the network data transmission processes.

As shown, the copy of the network data stream is received by a network processor 230. The network processor 230 can be programmable and can include computer executable instructions and additional internal or external processors and memory as needed to identify and manipulate the network data in the copy of the network data stream, and to communicate control signals to a distribution module 240. The network processor 230 can be any device that keeps track of transactions. For example, the network processor 230 can be a FPGA, an EZ-CHIP processor, a microprocessor, or other logic device, but is not limited to processors that execute software or firmware. The control signals can be any appropriate instructions, signal, or code capable of providing instructions to the distribution module 240 for directing the network data to any of the analysis processors 260*a-n*. The network processor 230 can identify different portions of the network data stream by transaction, by source, by destination, by protocol, by data type, or by any other network or data attribute and direct the appropriate portions of the network data stream to any of the analysis processors 260*a-n* based on the identification.

The distribution module 240 receives the network data stream from the network processor 230 and routes it to any of its several possible outputs according to the control signal received from the network processor 230. While the components of the network analysis system 200, such as the network processor 230 and the distribution module 240, are shown as distinct devices it should be appreciated that any of the components shown in any of the embodiments described herein, such as the network processor 230 and distribution module 240, can be combined into an integrated device design or broken into additional distinct components for accomplishing the described functions according to embodiments of the present invention. The outputs of the distribution module 240 that do not receive the network data are typically held in the inactive state or open-circuited, depending on the type of distribution module 240. The outputs of the distribution module 240 can all be held in the inactive state or open circuited in the instance that the network processor 230 determines that the network data should not be sent to any of the analysis processors 260*a-n*.

Upon routing the network data to a particular output of the distribution module 240, the network data can be received within at least one of several memory buffers 250*a-n*. The memory buffers 250*a-n* can be any appropriate type of memory buffer. For example, the memory buffers 250*a-n* can be first-in-first-out (FIFO) memory buffers coupled to the analysis processors 260*a-n*.

A FIFO memory buffer allows received data to "fall through" to its output queue with only a small delay. In one embodiment, input and output from the FIFO are controlled by separate clocks, and the FIFOs keep track of what data has entered and what data has been removed. As such, data is not lost if an analysis processor connected to the FIFO is not ready for each portion of the network data stream (e.g., packet of network data) as it is received by the FIFO so long as the FIFO is not allowed to fill up completely.

Thus, according to the example embodiment shown in FIG. 2A, the routing of the network data stream to each of the memory buffers 250*a-n* coupled to the analysis processors 260*a-n* can be controlled by the network processor 230 such that the processing of data is distributed between the analysis processors 260*a-n*. Moreover, the analysis processing of the network data can be distributed between the different analysis processors 260*a-n* such that multiple pieces of data belonging to specific transactions can be directed toward a particular analysis processor (e.g., 260*a*). In this manner, the different transactions included in the network data stream can be sorted to some extent prior to reaching the analysis processors 260*a-n*.

Each analysis processor 260*a-n* can also include, or be coupled to, memory (e.g., a hard disk drive (HDD)) for storage of data and storage of any results of the analysis conducted. Each analysis processor 260*a-n* can also be coupled to user input devices such as a keyboard and output such as a display or a printer. The analysis processors 260*a-n* can also be incorporated into higher level data-processing and storage systems as well as networks of computers. Additional hardware and/or processors can also be implemented as needed to accomplish each task.

Figure 2B:
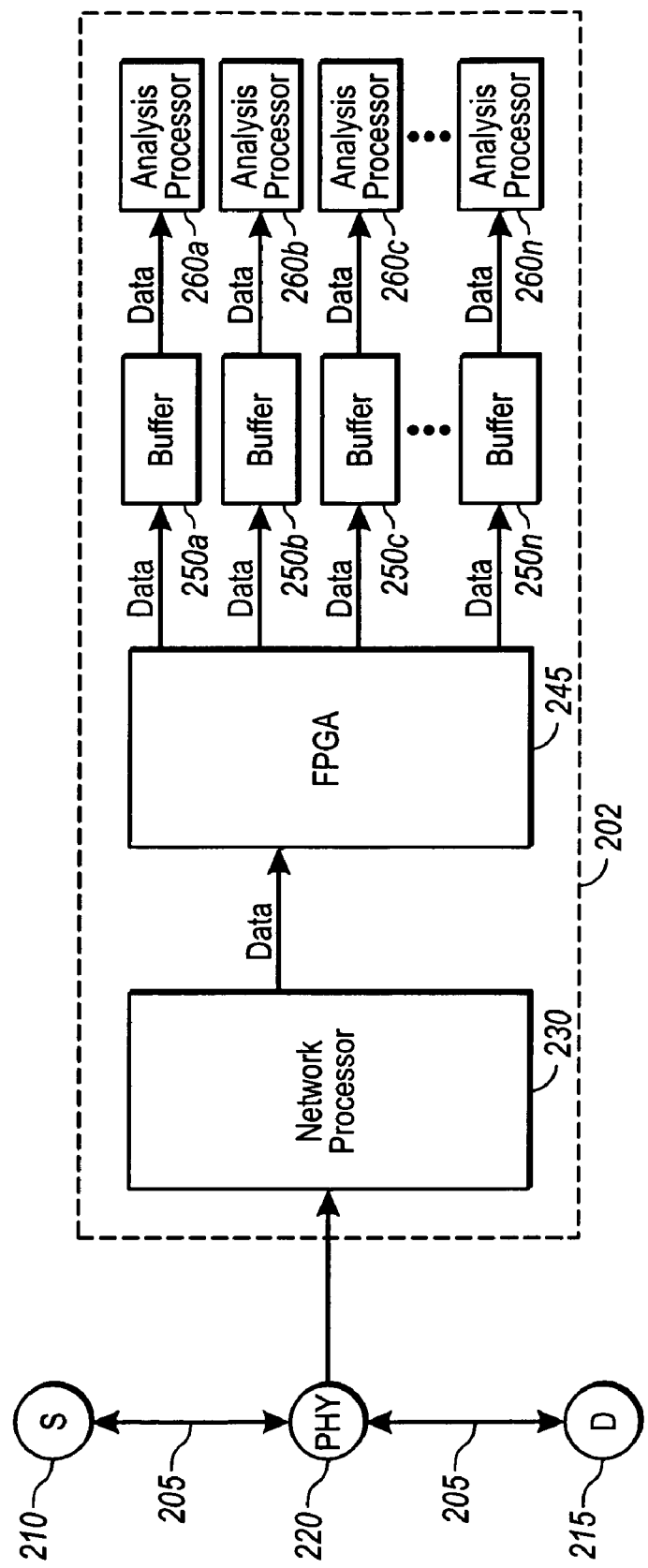
FIG. 2B illustrates a system for demultiplexing and analyzing a network data stream according to an example embodiment of the present invention.

Several different devices can be implemented to perform the tasks and processes described herein. Referring to FIG. 2B, a system 202 for demultiplexing and analyzing a network data stream is shown according to an example embodiment of the present invention. The system 202 for demultiplexing and analyzing a data stream is similar to that shown in FIG. 2A, except that a field programmable gate array (FPGA) 245, or other logic device, is used in conjunction with the network processor 230 to distribute, demultiplex, sort, and/or direct the network data or the packets of data to the analysis processors 260*a-n*. The system 202 can be adapted to analyze one or more layers as illustrated in FIG. 1. The FPGA is an example of a distribution module. Another example of a distribution module is a demultiplexer or a router chip.

Signals transmitted between the source 210 and destination 215 can be received by the analysis system 202 using the physical connection 220 coupled to the transmission link 205. A copy of the network data stream can be received by the network processor 230. The network processor 230 can be programmable and can include computer executable instructions, and additional internal or external processors and memory as needed to identify and manipulate the network data. The network processor can provide any appropriate signal capable of providing instructions to the FPGA 245 for directing the network data to any of the analysis processors 260*a-n*. For example, according to the embodiment depicted in FIG. 2B, the network processor 230 can insert fields into the network data that indicate to the FPGA 245 which analysis processor 260*a-n* to route the network data to. The network processor 230 can identify different portions of the network data stream by transaction, by source, by destination, by protocol, by data type, or by any other network or network data attribute and direct the appropriate portions of the network data stream to any of the analysis processors 260*a-n* based on the identification. An identification can be inserted into the network data at particular points that are received and recognized by the FPGA 245 and provide instructions to the FPGA 245 for routing the network data to any of the analysis processors 260*a-n*.

The FPGA 245 can receive the network data stream from the network processor 230 and route it to any of its several possible outputs according to the instructions received from the network processor 230. Upon routing the network data to a particular output of the FPGA 245, the network data is received within at least one of several memory buffers 250*a-n*. The routing of the network data to each of the memory buffers 250*a-n* coupled to the FPGA 245 can be controlled by the network processor 230 and carried out by the FPGA 245.

Figure 3:
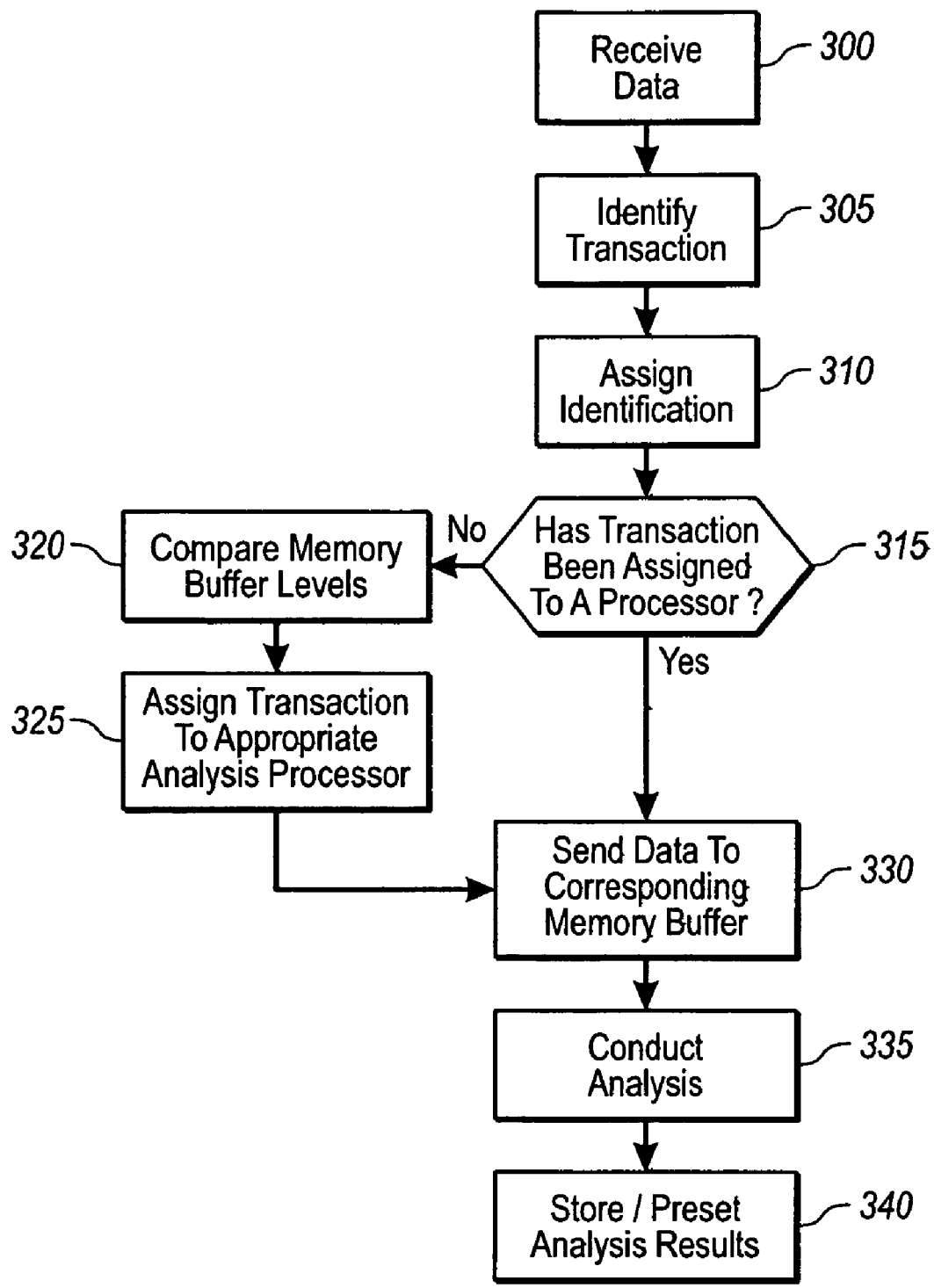
FIG. 3 is a flow diagram illustrating a method for directing data to an analysis processor according to an example embodiment of the present invention.

In some instances, for a processor to analyze a transaction at a higher layer the processor may need to receive the entire transaction prior to conducting the analysis. For example, FIG. 3 illustrates an example method for directing data to an analysis processor. Network data representing data transmitted in a network is received (300). A particular transaction to which the packet or primitive belongs can be identified (305). The packet or primitive can be assigned identification (310).

It can next be determined whether the transaction has been assigned to a particular analysis processor for analysis (315). There can be any number of processors for analyzing the various transactions communicated across a network. In the case that the transaction has not yet been assigned to a particular analysis processor for analysis, load balancing can be performed. In load balancing, the amount of data contained within each memory buffer (see, e.g., buffers 250*a-n* in FIG. 2*b*) connected to a processor can be compared (320) to determine an appropriate analysis processor to assign the particular transaction. For example, an appropriate analysis processor can be determined on the basis of the least amount of data held within a corresponding memory buffer so that the total analysis processing burden can be more evenly distributed across the processors. Certain processors can also be designated for particular types of analysis, network data types, or transactions, and packets and primitives can be directed to an appropriate processor on the basis of a desired type of analysis, or for any other reason.

The transaction can be assigned to an appropriate analysis processor (325), and the network data belonging to the transaction can be sent to the corresponding memory buffer (330). The desired analysis can be conducted on the data, primitives, or packets of data making up a transaction (335) as the case may be. The analysis can include analysis of the network data according to any of the various layers of analysis discussed above with reference to FIG. 1 for example. After the analysis is conducted, results of the analysis can be stored in a HDD, or presented to a user (340), for example.

Figure 4A:
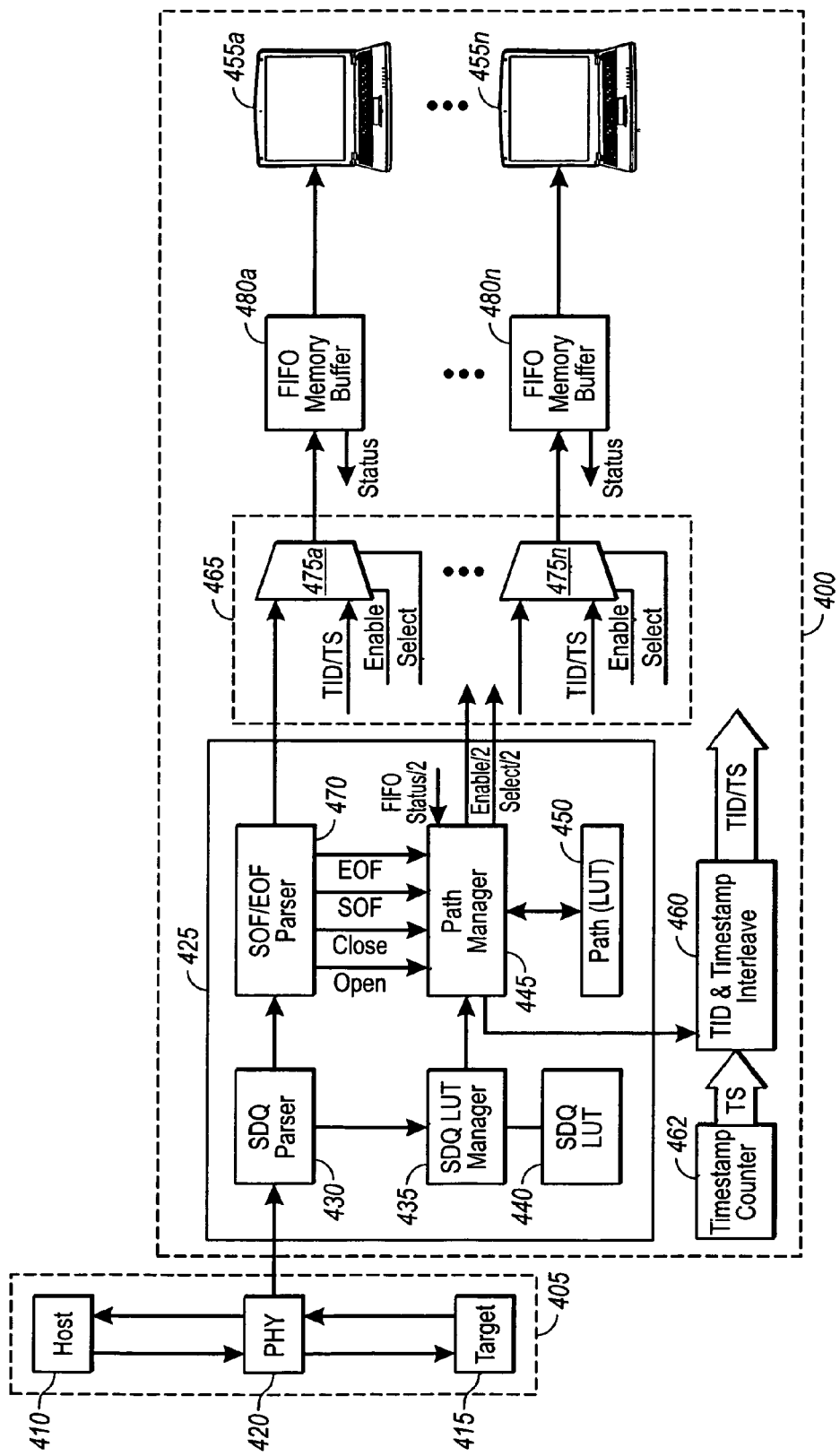
FIG. 4A illustrates a network analyzer according to an example embodiment of the present invention.

Apparatuses for practicing methods of demultiplexing and analyzing network data for errors can include various components, processes, and configurations according to different embodiments of the present invention. For example, referring now to FIG. 4A, a network analyzer 400 is shown according to an example embodiment of the present invention. A network 405 can include a host 410 and a target 415 in bidirectional communication. The network 405 can include several hosts and targets with network data relating to different transactions interleaved as is common in the transmission of data across communication networks.

The network analyzer 400 can receive network data from a physical connection 420 placed on a network link for producing a copy of the network data representing the network data stream transmitted across the network link, and forwarding the copy of the network data to a network processor 425. The network processor 425 can be any programmable network processor and can include multiple processors and hardware for executing logic to perform the described tasks. The network processor can also include internal and/or external memory devices for storing and accessing data. For example, according to an example embodiment of the present invention, the network processor 425 can be a general purpose programmable network processor such as EZ-CHIP NP-1c processor, which is made by EZ-CHIP. An EZ-CHIP processor is an example of a network processor that may be programmed to provide the functions described herein at a rate of speed sufficient for many example embodiments of the present invention.

The EZ-CHIP NP-1c processor is a 10-Gigabit full-duplex network processor providing fully programmable 7-layer packet classification, modification, forwarding and policing at wire speed. The 7-layer deep packet processing can provide support for advanced services and applications such as Network Address Translation (NAT), firewall, Virtual Private Networks (VPN), load balancing, storage and traffic analysis in addition to mainstream Layer 2-4 switching and routing applications.

In operation, the network processor 425 receives the network data stream including network data. An S/D/Q parser 430 can extract identification fields from the network data. For example, the parser 430 can be embodied as hardware and executable logic configured to extract fields such as source, destination, and Q tag (S/D/Q) information from of the network data. The S/D/Q information can relate to the source and destination of the transaction to which the packet of data belongs as well as an identification number (Q tag) assigned by the transmission system to the particular packet. The S/D/Q information can be sent to an S/D/Q look-up-table (LUT) manager 435 that queries an S/D/Q LUT 440 to determine whether the packet has been assigned a transaction identification (TID). The S/D/Q manager 435 can assign a TID to each piece of network data based on the S/D/Q LUT 440 query and can update the S/D/Q LUT 440 in the case that a TID has not been already assigned. Although primitives do not have S/D/Q information embedded in them, the network processor can determine the S/D/Q that the primitive is associated with based on packets received before or after the primitive.

The TID can be received by a path manager 445, which queries a path LUT 450. The path manager 445 determines an appropriate path based on the path LUT 450 query thereby indicating an analysis processor 455a-n assigned to the packet's TID. As a result, all pieces of network data, such as packets and primitives, which belong to the same transaction can be sent to the same analysis processor 455a-n. The path manager 445 forwards the TID to a TID and timestamp (TS) interleaver 460 that interleaves the TID with a TS signal received from a TS counter 462. The interleaved TID and TS can be routed to the distribution module 465 followed by the corresponding network data. Additional fields from the network data or primitive can be extracted by a SOF/EOF parser 470 and communicated to the path manager 445 along with other appropriate information so that the path manager 445 can establish an appropriate path for the correct duration for transfer of the network data. For example, the path manager 445 can receive open, close, start of frame (SOF) and end of frame (EOF) fields extracted from the network data by the SOF/EOF parser 470. In some instances, the path manager 445 may be able to leave an established path open for transfer of more than one piece of network data. The path manager 445 can leave an established path open until a different path needs be established.

The distribution module 465 can receive the interleaved TID/TS followed by the network data from the network processor 425 and route them to one of several possible outputs 475a-n according to control signals received from the network processor 425. For example, the network processor 425 can provide "select" and "enable" control signals for selecting one of several outputs 475a-n of the distribution module 465 and establishing a path by enabling such output to receive and transfer the network data packet to an appropriate FIFO memory buffer 480a-n. The other outputs of the distribution module 465 can be either held in the inactive state or open-circuited, depending on the type of distribution module 465.

Upon routing the network data packet to a particular output 475a-n of the distribution module 465, the network data can be received within one of the plurality of FIFO memory buffers 480a-n. The FIFO memory buffer that receives the primitive or data packet (e.g., FIFO 480a) allows the received data to "fall through" to the FIFO's output queue with only a small delay. Input and output from the FIFO buffers 480a-n can be controlled by separate clocks in one embodiment, and each FIFO 480a-n tracks what data has entered the FIFO 480a-n and what data has been removed from the FIFO's 480a-n queue. Each FIFO 480a-n can send a status signal to the network processor 425 indicating an amount of data stored in the particular FIFO's queue (e.g., FIFO 480a). The status signal, for example, can be used for load balancing or to change how the analysis processors 445a-n analyze the network data. Analysis can be prioritized, filtered, or otherwise altered using the status signal for example. The analysis performed by the analysis processors 455a-n can be altered using other criteria than the status signal.

The routing of the network data to each of the FIFO memory buffers 480a-n can be controlled by the network processor 425 such that the FIFOs 480a-n are not allowed to fill up completely, and so that the processing of the network data received from the network 405 can be distributed appropriately between the different analysis processors 455a-n for load balancing or for any other purpose. For example, the FIFO 480a receiving the network data can next forward the network data to its corresponding analysis processor 455a coupled to the FIFO 480a to analyze the network data and store the results of the analysis (e.g., any data including errors) in a HDD that can be internal or external to the analysis processors 455a-n. An additional storage processor can also be implemented and can include ready access memory for caching and managing the network data storage processes.

Another advantage of having several channels for network analysis is fault tolerancing. Fault tolerancing, as used herein, compensates for failure of a particular, channel of an analysis system. For example, in the instance that analysis channel providing network data to the analysis processor 455n fails for any reason, the analysis, channel providing network data to analysis processor 455a can still analyze the network data and the distribution module 465 can route the data intended for analysis processor 455n to analysis processor 455a and other analysis processor in the system. Methods of filtering network data and prioritized analysis can also be implemented with consideration of the failed analysis channel.

As discussed above, several different devices can be implemented to perform the tasks and processes described herein. For example, referring to FIG. 4B, a network analyzer 402 is shown according to an example embodiment of the present invention. The network analyzer 402 is similar to that shown in FIG. 4A, but network analyzer 402 can include a front-end FPGA 422 for receiving the network data and performing processes (e.g., analysis or routing processes) prior to the network data being received by the network processor 425. For example, the front end FPGA 422, or other logic device can interleave timestamp data into the network data before the network data is received by the network processor 425. In addition, a back-end FPGA 432 can be included as a distribution module for performing the demultiplexing and routing of the network data to multiple analysis processor 455*a-n*.

The present invention may facilitate analysis of network data in packet switched networks. When transferring data from a source to a destination the network data is often transmitted in packets of data, each packet making up a portion of a transaction. Each transaction can be broken into packets of a certain size in bytes. Each packet can carry with it the information that will help it get to its destination and identify the packet or the transaction to which it belongs. For example, the packet may include the source network or IP address, the intended destination's network or IP address, information that tells the network how many packets the transaction has been broken into and identifies the particular packet. The packets carry the network data in the protocols that the network uses and each packet contains part of the network data making up a transaction.

Depending on the type of network, packets of data and portions of the network data stream can also be referred to as frame, block, cell, segment, etc. A packet can include many different fields such as, for example, a header, a body, and a footer. The packet can be parsed to access the desired information in each field of the packet. The packet can contain instructions about the network data carried by the packet. These instructions may include the length of a packet (e.g., some networks have fixed-length packets, while others rely on the header to contain this information), synchronization (e.g., a few bits that help the packet match up to the network), packet identification number or "Q" number (e.g., which packet this is in a sequence of packets), protocol (e.g., on networks that carry multiple types of information, the protocol can define what type of packet is being transmitted (e.g., e-mail, web page, streaming video), destination address (where the packet is going), and originating address (where the packet came from). Generally, the body, or data payload, of a packet is the actual data that the packet is delivering to the destination. Some network protocols, such as Fibre Channel, also have Primitives which typically carry, information associated with the lower layers of the protocol. Some Primitives carry information about the transaction they reside in. Other primitives may carry information that spans multiple transactions.

The front end FPGA 422 can receive the network data before it is provided to the network processor 425. The front end FPGA 422 can also modify the frames or packets of the network data stream. For example, the payload of a frame can be completely or partially removed, and statistics can be inserted in its place. This way, the network data payload need not be passed to the network processor in all instances. This enables the network processor to handle a data stream of a larger bandwidth than the network processor would typically be able to handle. Tick frames can also be generated and interleaved similar to that described above with reference to timestamps. Tick frames will signal the network processor that a certain amount of time (e.g., 1 second) has elapsed and will signal the network processor to upload statistics to an analysis processor. Primitives can be combined with a Timestamp into a special frame and provided to the network processor.

Figure 4B:
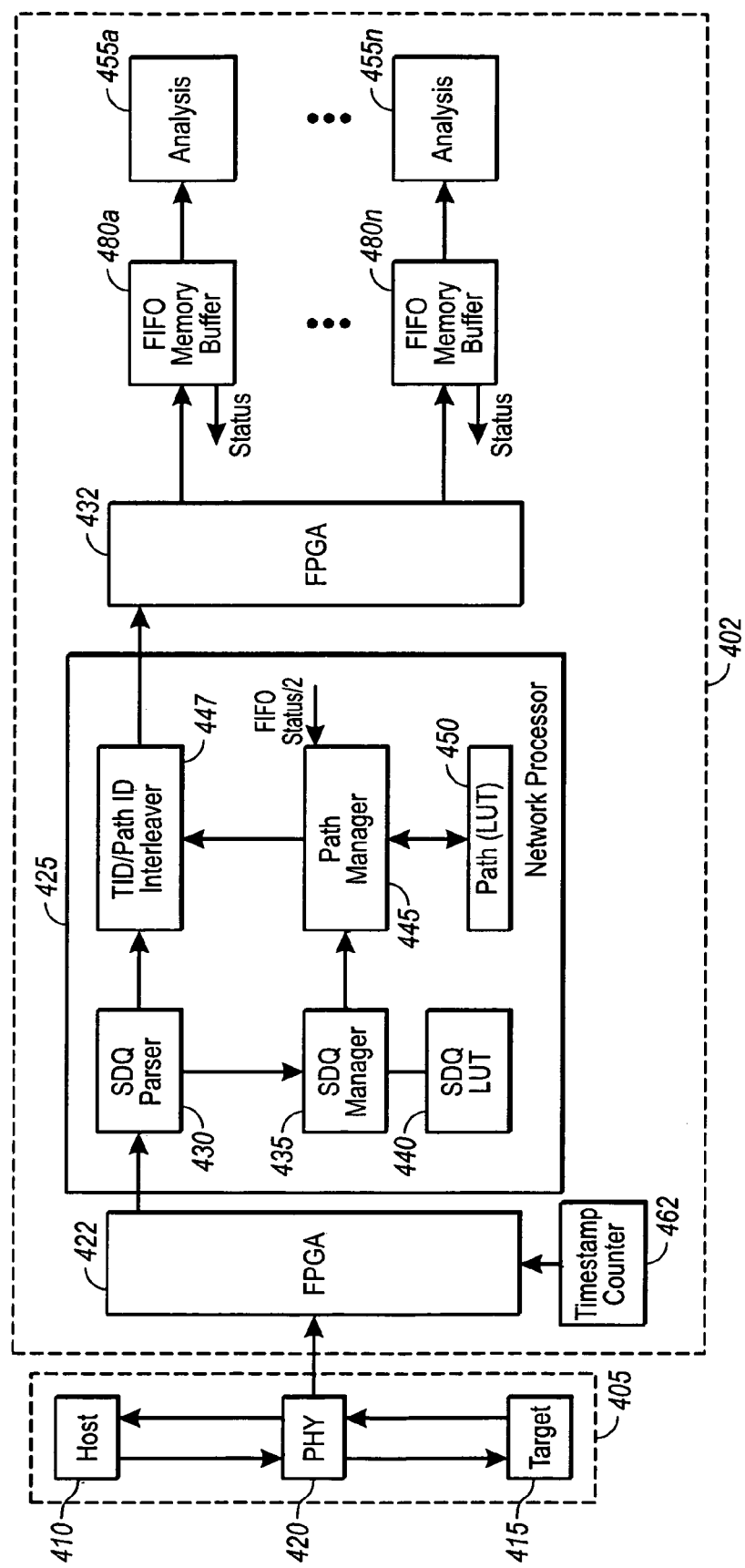
FIG. 4B illustrates a network analyzer having upstream and downstream logic device hardware according to an example embodiment of the present invention.

According to an aspect of embodiments of the present invention the front end FPGA 422, or other logic device, can create a special header for each packet and/or primitive. The header can contain a timestamp, and in cases where multiple ports are receiving network data being analyzed can contain a port number. Multiple ports can be defined as simply as a Host port 410 and a Target port 415 as shown in FIG. 4B, or can be a larger number of ports since some protocols, such as Serial Attached SCSI, use multiple serial data streams for higher bandwidth, and the network data within a single transaction may be sent on any of the multiple ports. These multi-port/single-transaction streams can introduce new types of protocol errors associated with port selection and port management and the analyzer can keep track of which port the packet or primitive came in on in order to troubleshoot port-related issues.

An encapsulated Packet can contain the fields such as Header Type (type=packet), Timestamp, Port Number, and the original packet, for example. An encapsulated primitive can contain fields such as Header Type (type=primitive), Timestamp, Port Number, Repetitive Primitive Count, and the original primitive. A Repetitive Primitive Count can be used if the front-end FPGA counts repetitive primitives and sends them to the network processor as a primitive value and count instead of sending each repetitive primitive individually.

Figure 4C:
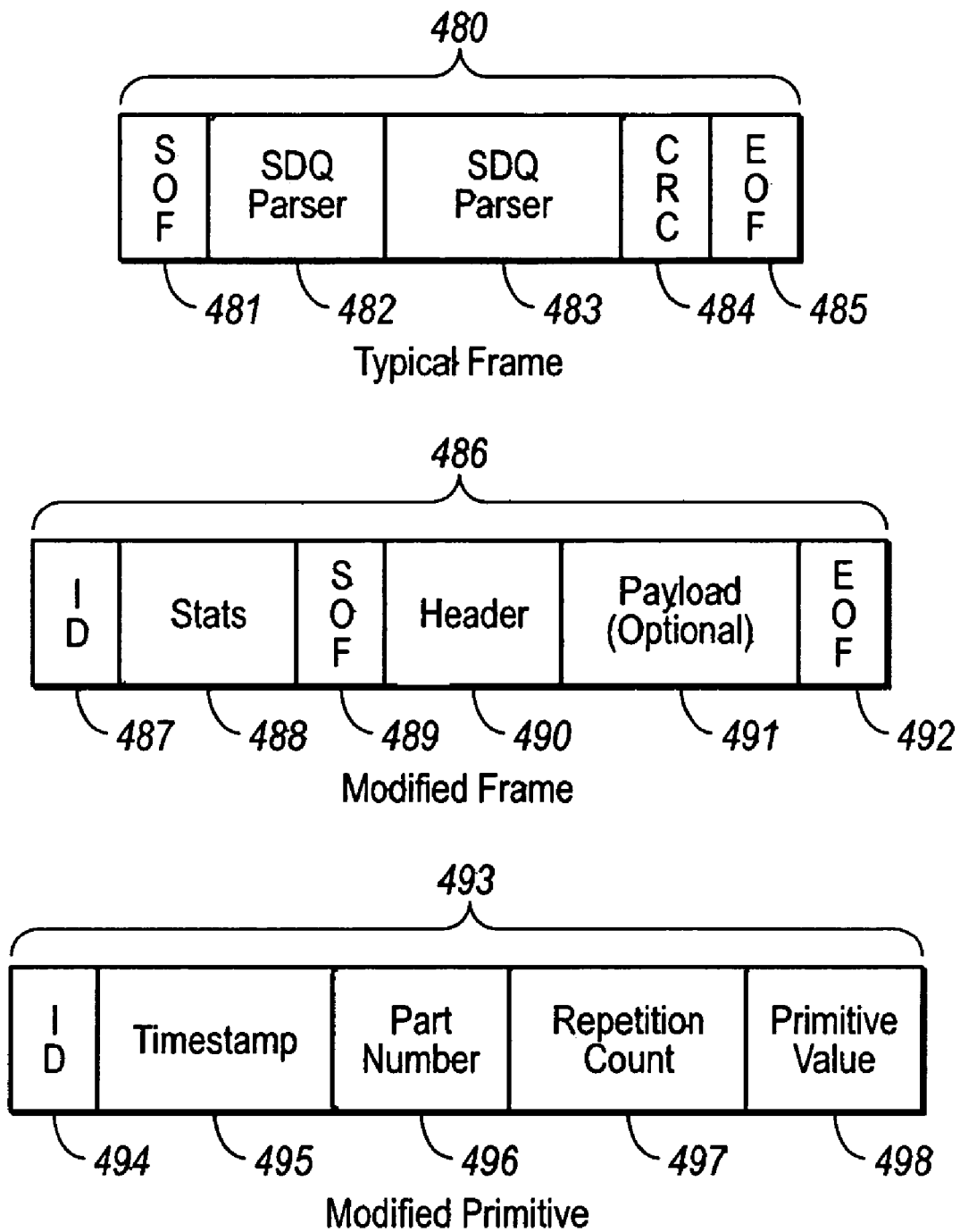
FIG. 4C illustrates a typical frame, a modified frame, and a modified primitive according to an example embodiment of the present invention.

For example, with cross reference to FIGS. 4B and 4C, a typical frame 480, a modified frame 486, and a modified primitive 493 are shown according to an example embodiment of the present invention. The typical frame 480 can include SOF 481, header 482, payload 483, CRC 484 and EOF 485 portions. The modified frame 486 can include an ID portion 487, a stats portion 488, and the original frame optionally excluding the payload 491 of the original frame. The stats portion 487 can include a port number, a timestamp, or other descriptive information. The ID 487 can be an identification assigned by the FPGA 422 or other device of the analyzer 480. The payload 491 can be excluded from the packet for any reason. For example, the payload 491 can be excluded where analysis of the payload 491 will be excluded and as a result there is no need to transmit the payload 491. An indication that the payload 491 has been excluded can be written to the stats portion 488, or other portion of the modified frame 486.

The modified primitive 493 can include an ID 494, a timestamp field 495, a port number field 496, and any other information, which can be written to the modified primitive 493 by the front end FPGA 422 or other device. Repetition count information 497 can be written to the modified primitive 493 where multiple primitives have been excluded and the repetition count portion 497 of the modified primitive 493 can describe the total number of primitives excluded but described by the primitive 440. The value of the primitives value 498 can be included with the primitive 493 so that an analysis processors 455*a-n* can keep track of the number of primitives excluded from analysis and their value.

According to embodiments of the present invention, a SPI4.2 header can be placed on the network data by the network processor 425 or one of the FPGAs 422 or 432 for purposes of directing the network data to a specific output port. One of the FPGAs 422 or 432 can be used for the routing.

However, any router chip compliant with SPI4.2 can be used to perform the job of the distribution module discussed herein. There are many ASICs designed as SPI4.2 routers that can do the job of distribution and any embodiments of the present invention can include any SPI4.2 router.

According to another aspect, pre-analyzing by the Network Processor 425 or the front end FPGA 422 can be conducted so that the amount of analysis performed by the analysis processors 455a-n is reduced, or the amount of data that is transferred to the analysis processors 455a-n is reduced. For example, rather than providing each packet and each primitive in a transaction to an analysis processor 455a-n, the network processor 425 can summarize each transaction and only provide the summary data to the analysis processor 455a-n. For example a summary could include the S/D/Q, a command, a response, a number of payload bytes, a number of payload packets, a start time, and an end time.

Referring still to FIG. 4B, the network analyzer 402 can receive network data from one or more physical connections 420 placed on a network link and forward the copy of the network data to the front-end FPGA 422. If multiple physical links or ports are being analyzed, the front-end FPGA can keep track of which port the network data came from. The front-end FPGA 422 can receive the network data along with a timestamp value from a timestamp counter 462. The front-end FPGA 422 can interleave or insert the timestamp values with the port number and network data and forward the resulting network data, port number, and timestamp data to the network processor 425. The network processor 425 can receive the network data stream including the timestamp data. A S/D/Q parser 430 can extract identification fields from the packets of data. The S/D/Q information can be sent to a S/D/Q look-up-table (LUT) manager 435 that queries a S/D/Q LUT 440 to determine whether the S/D/Q has been assigned a transaction identification (TID). The S/D/Q manager 435 can assign, a TID to each packet or primitive based on the S/D/Q LUT 440 query and updates the S/D/Q LUT 440 in the case that a TID had not been already assigned.

The TID can be received by a path manager 445, which queries a path LUT 450. The path manager 445 can determine an appropriate path based on the path LUT 450 query thereby indicating an analysis processor 455a-n assigned to the packet's TID. The path manager can 445 interleave or insert path and/or TID data with the network data using a TID/path interleaver 447. The timestamp, path, and/or TID data can be interleaved with the network data as fields included with each packet of data or primitive, or added as an additional header to each packet or primitive. The interleaved path, TID, timestamp, and network data can be transmitted to the back-end FPGA 432.

The back-end FPGA 432 can receive the network data and route it to one of several possible outputs according to the path or TID data interleaved with the network data. The path data, as well as additional fields from the network data packet or primitive can be extracted by the back-end FPGA 432 along with other appropriate information so that the FPGA 432 can establish an appropriate path for the correct duration to transfer the network data to one of the FIFO memory buffers 480a-n. The back-end FPGA 432, a router chip, and a demultiplexer are examples of distribution modules.

Upon routing the primitive or data packet to a particular output of the back-end FPGA 432, the network data can be received within one of the plurality of FIFO memory buffers 480a-n. Each FIFO 480a-n can send a status signal to the network processor 425 indicating an amount of data stored in the particular FIFO's queue (e.g., FIFO 480a). The routing of the network data to each of the FIFO memory buffers 480a-n can be controlled by the network processor 425 and carried out by the back-end FPGA 432 such that the FIFO memory buffers 480a-n are not allowed to fill up completely, and so that the processing of the network data received from the network 405 can be distributed appropriately between the different analysis processors 455a-n.

The FIFO 480a-n receiving the network data next forwards the network data to its corresponding analysis processor 455a-n to analyze the network data and store the results of the analysis in a HDD inside the analysis processor 455a-n. An additional storage processor can also be implemented and can include ready access memory for caching and managing the network data storage processes. Also, multiple storage mediums, such as HDDs, can be coupled to each analysis processor 455a-n for storing network data for later retrieval and analysis as needed.

Figure 5:
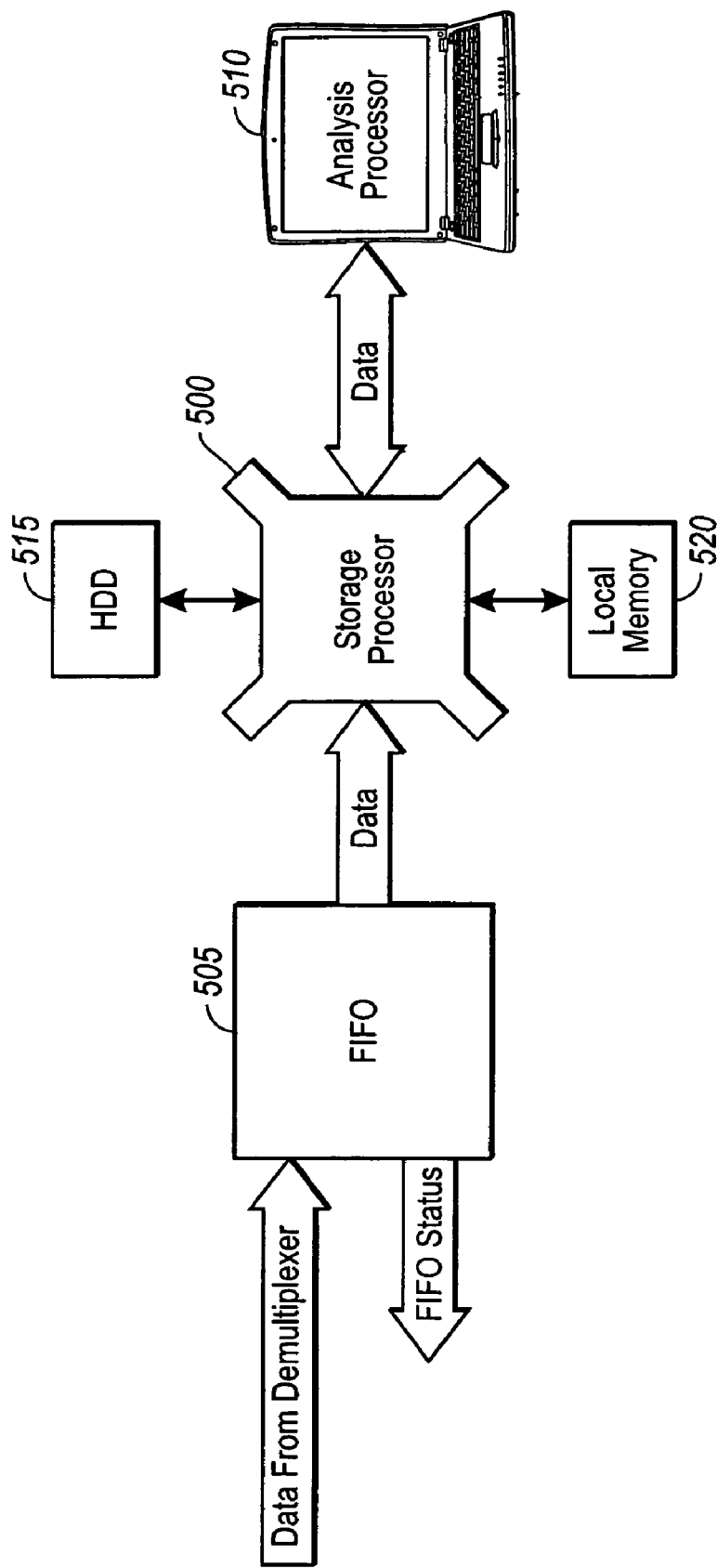
FIG. 5 illustrates a storage processor in conjunction with a gigabyte FIFO memory buffer and an analysis processor.

Referring to FIG. 5, a storage processor 500 is shown in conjunction with a FIFO memory buffer 505, local memory 520, and an analysis processor 510 illustrating an example of how additional processors and hardware can be implemented according to the present invention. The FIFO memory buffer 505 can receive the network data from a distribution module, such as a demultiplexer or a FPGA (see e.g., FIGS. 4A and 4B), which can be preceded by an interleaved TID and TS. The FIFO 505 can also send a FIFO status to be received by a network processor for controlling and directing data to an appropriate FIFO buffer and analysis processor.

The FIFO memory buffer 505 can forward the network data to the storage processor 500 that is coupled to a HDD 515 and can work in conjunction with the analysis processor 510 for storage of data in the HDD 515 including storage of errors, network data, and storage of results of an analysis conducted by the analysis processor 510. The storage processor 500 can also store network data that has not been fully analyzed (e.g., because it has been selected for filtering or only partially analyzed as discussed in further detail herein) and can be later retrieved and forwarded to the analysis processor 510 for processing.

It should be appreciated that many of the embodiments of the present invention can be carried out using a single processor coupled to a hard disk drive and local memory doing the entire job of analyzing data from the FIFO without the need for additional storage or an additional storage processor. Moreover, many embodiments of the present invention can be carried out using only a conventional or special purpose computer, which can be coupled to a FIFO memory buffer receiving network data, and additional components may not be required.

2. Demultiplexing with Distributed Analysis

In one embodiment, only one analysis processor receives a piece of network data. According to another embodiment of the present invention, the same network data can be sent to multiple analysis processors using a data distribution module such as a demultiplexer or an FPGA. This gives a network analyzer the capability of sending a single input data stream to any number of outputs of the distribution module including multiple outputs of the distribution module. Each output of the distribution module can be coupled to a different analysis processor and any number of the coupled analysis processors can potentially analyze the same data for any number of analysis tests or layers of analysis. The routing of the network data to the analysis processors, as well as the type of analysis conducted on the network data by each processor, can be determined on any basis. For example, the routing of the network data to the analysis processors, and the tests conducted on the network data at each analysis processor can be determined based at least in part on the amount of data stored in a memory buffer coupled to an analysis processor.

Figure 6:
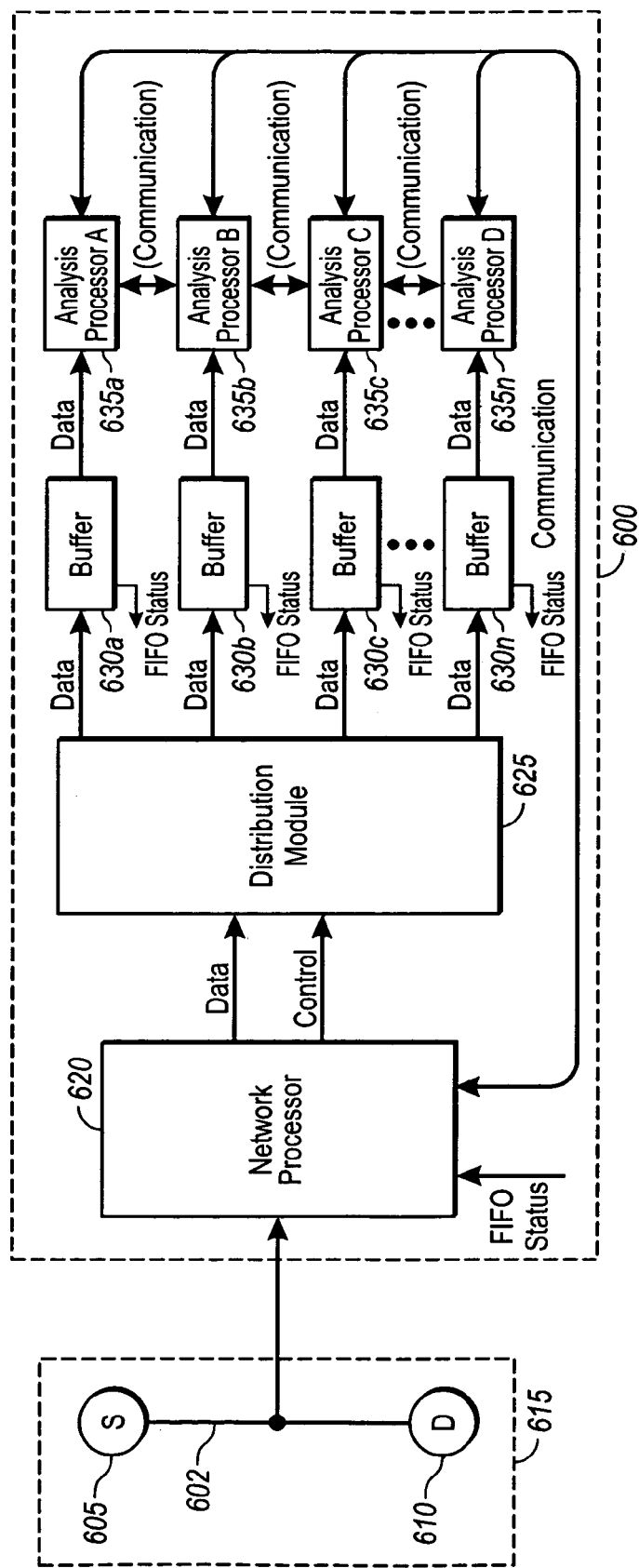
FIG. 6 illustrates a system for analyzing data according to an example embodiment of the present invention.

Referring now to FIG. 6, a system 600 for analyzing data is shown according to an example embodiment of the present invention. A network link 602 transmitting a data stream between a source 605 and a destination 610 in a network 615 can be tapped and network data representing at least a portion of the network data stream can be received by a network processor 620. The network data can be transmitted to a distribution module 625 along with a control signal from the network processor 620. The distribution module 625 can be a demultiplexer, FIGA, or router chip capable of routing the network data to multiple outputs of the distribution module 625 based on the control signal received from the network processor 620. Front-end and/or back-end FPGAs can also be implemented as discussed above with reference to FIG. 4B in this or any of the embodiments described herein.

Each output from the distribution module 625 can be coupled to a memory buffer 630a-n (e.g., a FIFO memory buffer). Each memory buffer 630a-n that receives the network data can act as a data buffer and provide the network data in turn to a corresponding analysis processor 635a-n. Any number of the analysis processors 635a-n may be configured to conduct different analysis tests on the network data received than the other analysis processors. The analysis tests conducted by any of the analysis processors 635a-n can be determined based on any appropriate basis. For example, the analysis tests of at least two of the analysis processors 635a-n receiving the same network data can be different, thereby distributing the processing burden of a single piece of network data across multiple analysis processors 635a-n. The analysis processors 635a-n can be in communication with other analysis processors 635a-n and/or the network processor 620 to dynamically coordinate the testing of data, and/or to monitor the amount of network data in the memory buffers 630a-n.

For example, analysis processor 635a can perform analysis that verifies the structure of headers in the network data. Analysis processor 635b can perform analysis that verifies content, rather than structure of the headers, such as values within the fields of the same network data. Analysis processor 635c can perform analysis that verifies the protocol payload of the same network data. Analysis processor 635n can perform analysis that verifies the primitive handshakes and/or initialization sequence of the same network data. In this manner, the processing burden for these various analyses and tests can be distributed between the various analysis processors 635a-n. Further, the number of tests can be increased since the bandwidth of processing power has been increased by such a system.

According to an example embodiment of the present invention, the analysis tests and routing of data can be dynamically determined based, at least in part, on the amount of data stored in a memory buffer. For example, where the amount of data stored in a memory buffer attached to an analysis processor reaches a predetermined amount, incoming data can also be routed to additional analysis processors and the number and/or types of tests conducted by the processors can be distributed between the processors. The analysis and tests can be distributed between the processors to distribute the processing burden, and/or the same test can be run by multiple processors where redundant testing is desirable for example. In one embodiment, the analysis performed at the analysis processors 635a-n can be adjusted dynamically. The distribution of data to the various analysis processors as well as the specific analysis performed at those analysis processors can be adjusted on-the-fly and can be based, by way of example, on current network conditions, FIFO status, the need to perform specific tests, and the like, or any combination thereof. In an embodiment where multiple processors are analyzing the same network data, it can be desirable for a communication path to exist between the processors so that they may coordinate an efficient means of dividing the workload of analysis processing (e.g., load balancing). Inter-processor communication channels are well known in the art.

Many different methods for practicing embodiments of the present invention can be implemented. For example, referring to FIG. 7 a block diagram illustration of a method for analyzing data is shown where the same data is distributed to multiple analysis processors such that additional or different tests can be performed on the same data. Network data can be received (700) representing at least a portion of a data stream. A status signal can be received (710) from a FIFO buffer or from an analysis processor and compared to a threshold (720) although the status signal may reflect the threshold of the buffer. In other words, the status signal from a particular buffer can represent an amount of data in that buffer. The threshold can represent an amount of data in a memory buffer at which point analysis processing of the same network data will be distributed across multiple processors or at which point the network data is directed to other analysis processors to achieve load balancing.

In the instance that the status signal indicates that the threshold of the buffer is not yet reached, (or a condition has not been met) the network data may be forwarded to an analysis processor corresponding with that buffer for network analysis (750). In the instance that the status signal indicates that the threshold has been passed (or a condition has been met), the network data can be routed to additional analysis processors (730) and the network analysis tests can be distributed between the analysis processors receiving the network data (740). The network analysis is conducted on the network data by the appropriate analysis processors (750). Although this example illustrates that the same network data is distributed to multiple analysis processors based on the status of the buffer, the same network data can be distributed to other analysis processors for other reasons as well. For example, it may be the case that each analysis processor can more efficiently implement a particular set of tests for a given set of network data and network data can be distributed based on this condition.

3. Filtering Data

According to another aspect of the present invention, at least a portion of a network data stream such as data packets, primitives, or transactions can be selectively filtered such that they are selectively excluded from analysis. Network data can be excluded for any appropriate reason. For example repetitive network data, or network data where the result of analysis of the network data is known, can be excluded. This may be advantageous where large amounts of repetitive network data transactions will require several layers of expert analysis and produce an undesirable burden on an analysis apparatus. The filtering can also be based on various attributes of the network data transfer mechanisms, protocols, and transactions.

According to example embodiments of the present invention, a filter LUT can be maintained to identify network data and track the results of different analysis processes conducted during a predefined time frame. The filter LUT can be organized based on transactions such as a particular source and destination pair. The filter LUT can further keep track of whether any errors were discovered by particular tests conducted on data transferred between a source and destination pair.

In this manner, the processing bandwidth can be reserved for more critical analysis such as those analyses that have not been conducted, more critical network data, or that have a history of finding errors. However, it can also be set up so that the filter LUT is at least partially cleared after a period of time. For example, at certain intervals at least a portion of the filter LUT can be cleared such that a fresh history of transactions and errors are recorded periodically. The time period can also be based in part on the frequency of errors discovered, how critical detection of the errors is, or other attributes of the network data or network analysis.

Referring now to FIG. 8, a flow diagram illustrating a method for analyzing a network data stream implementing filtering techniques is depicted according to an example embodiment of the present invention. A data stream can be received from a network (800). It can be determined whether filtering techniques should be implemented (815). For example, a threshold (or other condition) can be compared to a status signal from a memory buffer. The threshold can be a predetermined threshold amount of data in a memory buffer at which point certain data, such as repetitive data or data with a known analysis result, will be excluded from further analysis. In the instance that filtering is not proper, the packet is not selected for filtering. If filtering is not implemented, the packet can be routed to an appropriate memory buffer and subsequent expert analysis can be conducted (820). The results of the analysis can be stored in a HDD or presented to a user via a display or printer (825).

In the instance that filtering is proper, for example when the amount of data stored in the memory buffer is larger than the threshold or a condition is met, the packet is selected for filtering and it is determined whether the network data is of the type designated for exclusion from analysis (830). The threshold can be any amount or condition and the comparison can be conducted at predetermined intervals. For example, the threshold can be equal to a status signal indicating that a memory buffer is at least 70% full. The threshold can represent the queue level in a single memory buffer, or can be determined from a combination of any number of memory buffers. In the instance that the network data or transaction is of the type indicated for exclusion, the network data can be excluded from analysis and an indication of such exclusion can be saved to a memory or presented to a user (825). In the instance that the network data or transaction is not the type indicated for exclusion, the network data can be forwarded to an appropriate memory buffer for subsequent expert analysis processing (820).

The network data can be excluded, for example, by not establishing a link to an analysis processor for processing the network data. An indication of the network data exclusion can be accomplished, for example, by establishing a communication link to an appropriate processor for only a TID/TS signal without a network data payload indicating that the signal was excluded from further analysis.

Several different levels of filtering can also be implemented for status signals indicating different amounts of network data in a memory buffer queue. For example, if a memory buffer is 70% full a first level of data filtering may be selected such that a first group of network data is selectively excluded from further analysis processing. Additionally, a second higher level of filtering can be selected when the memory buffer reaches 85% full selecting a second additional group of network data for exclusion from analysis processing. Any number of levels of filtering can be implemented, and groups of network data including contents of filtering LUTs designated for filtering can be defined by any appropriate means. Filtering can also be implemented by altering the analysis performed by the analysis processors. For example, the number of tests performed by the analysis processors can be reduced. As the status signal from the buffer changes, the tests performed by the analysis processors can be adapted accordingly in an example embodiment.

Apparatuses for practicing a method of analyzing a data stream implementing filtering techniques can be embodied in a number of configurations, combinations of mechanisms, and sequence of processes. For example, referring now to FIG. 9, a network analysis system 900 implementing filtering techniques, such as those described above, is shown according to an example embodiment of the present invention. A network data stream can be received from a bidirectional network link 905 between a host 910 and a target 915 representing a portion of a communication network 920. Network data representing at least a portion of the network data stream can be transmitted to a network processor 925. The network processor 925 can include a S/D/Q parser 930 that extracts S/D/Q fields from the network data and forwards the S/D/Q information to a S/D/Q LUT manager 935. The S/D/Q LUT manager 935 can access a SDQ LUT 940 and assign the network data a TID that is sent to a filter manager 945. The filter manager 945 can receive a status signal from a FIFO memory buffer 950 coupled to an analysis processor 955. The status signal may indicate the amount of data stored in the FIFO memory buffer 950 for example. The filter manager 945 can compare the status signal to a filter threshold to determine whether to begin excluding data from further processing by the analysis processor 955.

In the instance that the status signal is smaller than the threshold level (e.g., indicating that the amount of data stored in the FIFO's 950 queue is lower than a threshold amount), filtering is not selected and the filter manager 945 can communicate with a path control parser 960 so as to forward the network data packet to the FIFO memory buffer 950 for subsequent processing by the analysis processor 955. Results of the analysis can be saved to memory or presented to a user.

In the instance that the status signal is greater than the threshold (e.g., indicating that the amount of data stored in the FIFO's 950 queue is above a threshold amount) filtering can be selected and the filter manager 945 can access a filter manager LUT 965 to determine whether the network data is of a type selected for exclusion. In the instance that the network data is of the type selected for exclusion (e.g., the network data is repetitive or analysis results are known), the network data can be excluded from analysis for errors by the analysis processor 955. In the instance that the network data is not of the type, indicated for exclusion from analysis, the network data can be forwarded to the FIFO memory buffer 950 for analysis by the corresponding analysis processor 955. Results of the analysis, or an indication that the network data was excluded from the analysis, can be saved to memory or presented to a user.

Figure 9:
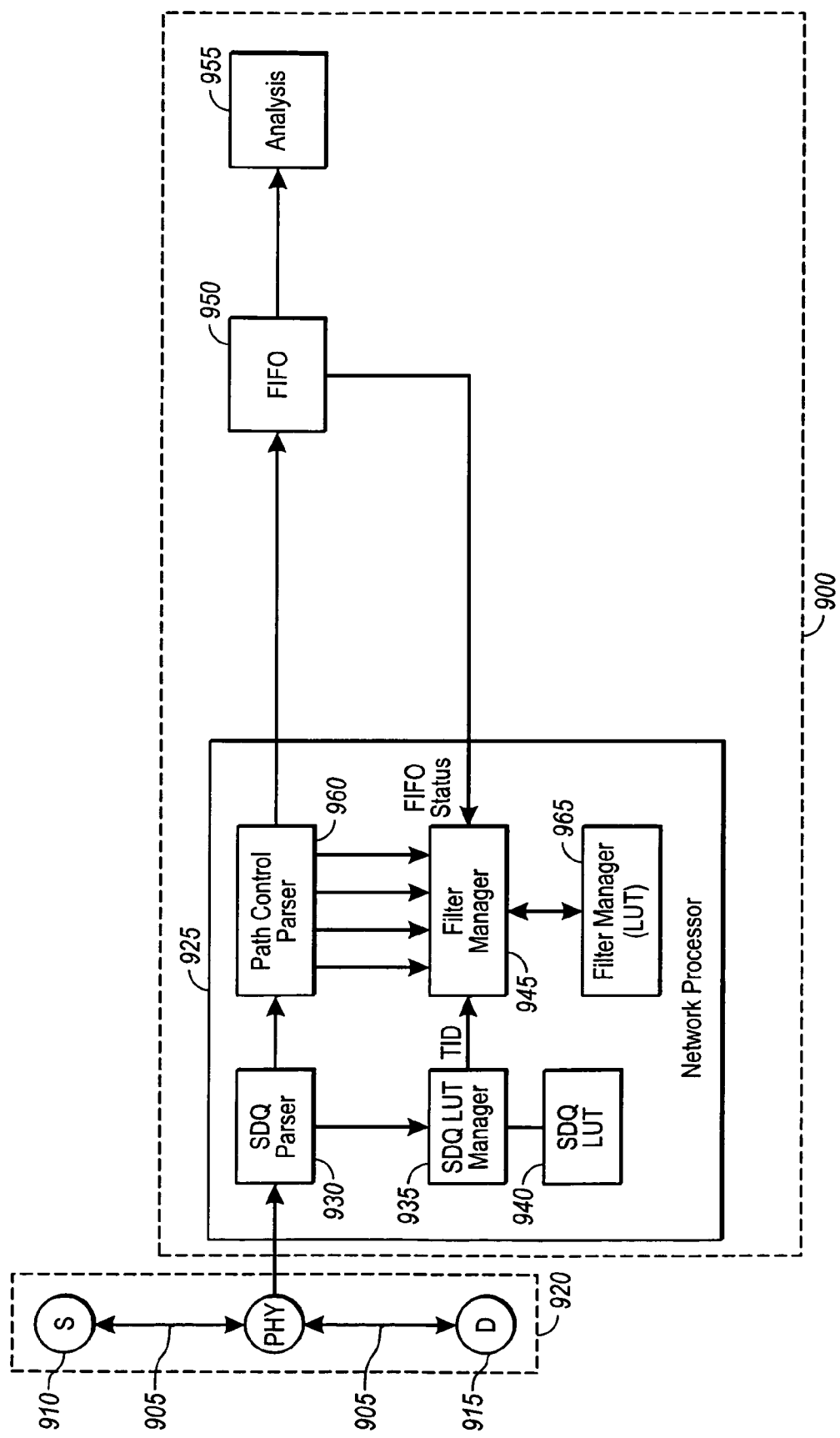
FIG. 9 illustrates a network analysis system implementing filtering techniques according to an example embodiment of the present invention.

It should be appreciated that FIG. 9 depicts an example embodiment including a single FIFO 950 and analysis processor 955 without additional demultiplexing aspects of the present invention discussed herein. According to other embodiments of the present invention, the filtering techniques can be combined with other aspects of the present invention. Data and transactions can be filtered and demultiplexed to one of several memory buffers and several corresponding analysis processors. In addition, the analysis processors can also receive the status signal as well as communicate with the network processor in order to implement filtering at the analysis processors such that the number of tests, or network data tested, is adjusted.

Figure 10:
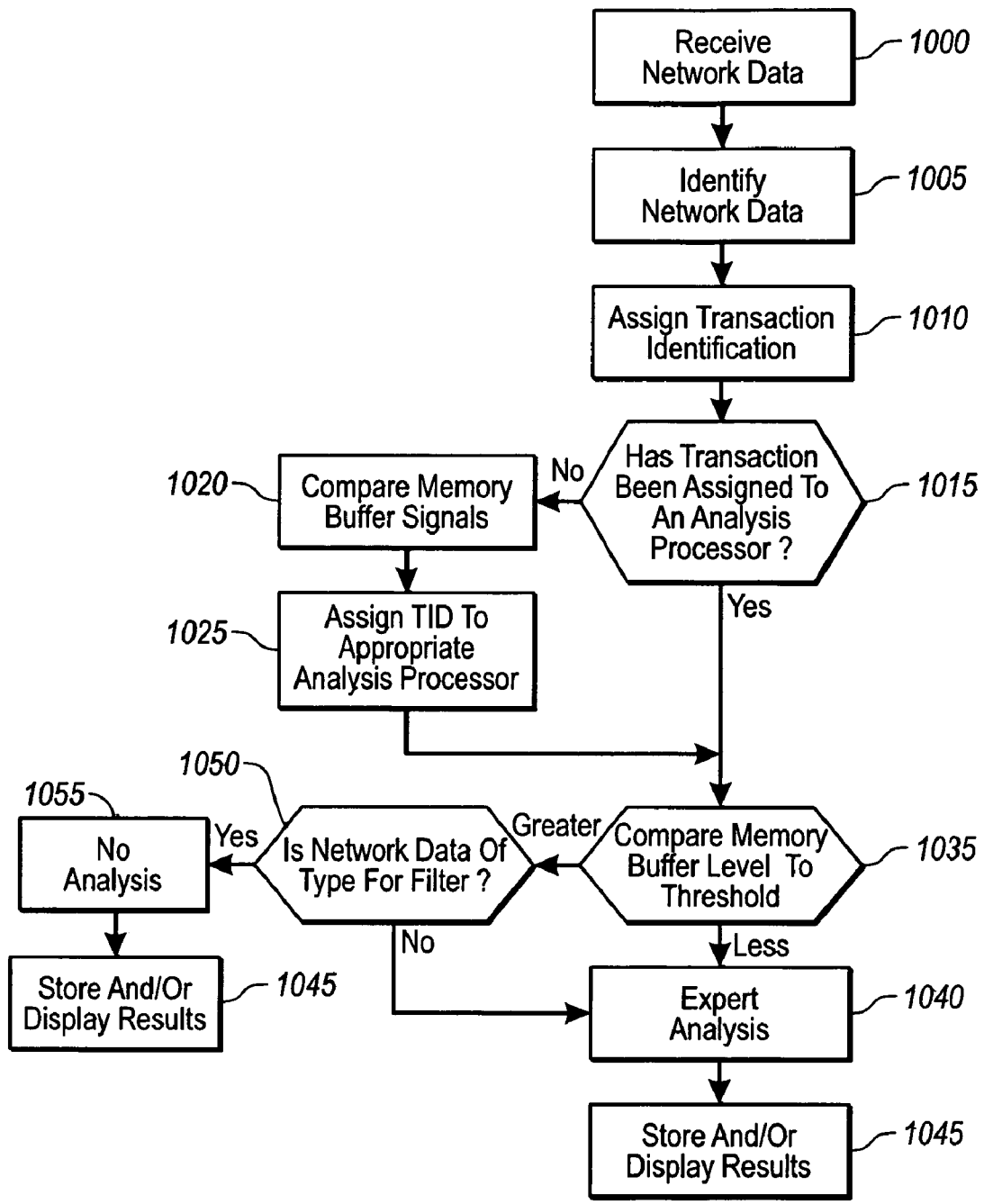
FIG. 10 is a block diagram illustrating a method for analyzing data including filtering techniques and demultiplexing of the network data to multiple FIFO memory buffers coupled to multiple analysis processors according to an example embodiment of the present invention.

For example, referring to FIG. 10, a block diagram illustrating a method for analyzing data including filtering and demultiplexing techniques is shown according to an example embodiment of the present invention. A network data stream is received (1000) and network data can be identified (1005). Transaction identification can be assigned to the network data (1010) and it can be determined whether the identification has been assigned to an analysis processor (1015). In the instance that the identification has not been assigned to an analysis processor, signals can be compared (1020) from all memory buffers connected to a distribution module and the TID can be assigned to an appropriate memory buffer (1025) (e.g., a memory buffer with the least amount of network data stored therein). It should be understood that the identification can be assigned on any basis. For example, the identification can be assigned to a particular memory buffer and analysis processor based on the particular transaction, source, destination, data type, protocol, etc.

After an appropriate memory buffer and analysis processor have been assigned, a signal from the assigned memory buffer can be compared to a filter threshold (1035). The filter threshold can be an amount of network data in the memory buffer's queue (e.g., at least about 70%-85% of capacity) at which point filtering techniques will be implemented. In the instance that the signal indicating the amount of data stored in the memory buffer is less than the filter threshold, the network data can be sent to the assigned memory buffer and expert analysis can be conducted by the assigned analysis processor (1040). Results of the analysis or network data including errors can be stored and/or presented to a user (1045).

In the instance that the signal from the memory buffer is greater than the filter threshold, it can next be determined whether the network data is of the type indicated for exclusion from expert analysis (1050). If the network data is not of the type indicated for exclusion, the network data can be forwarded to the appropriate memory buffer and analysis processor, and expert analysis can be conducted on the network data (1040). A result of the analysis can be stored and/or displayed (1045). In the instance that the network data packet is of the type indicated for exclusion from analysis, the network data may not be analyzed (1055), but the TID and an indication that the network data was not analyzed can be stored in memory and/or presented to a user 1045.

It should be appreciated that different levels of filtering can be implemented for different amounts of data in the memory buffer queues. For example, there can be two or more filtering thresholds that correspond to different levels of filtering at different amounts of network data in the applicable FIFO queues. Different types of filtering can also be implemented where the network data is assigned to a different analysis processor for different analysis processing tests (e.g., less testing) based on a status signal received from a memory buffer. Also, filtering can be implemented independently of the status of the memory buffer queues. Filtering can implemented based on characteristics of the network data itself as previously described, on specific needs of a network operator, and the like.

4. Prioritized Analysis

According to another aspect of the present invention, analysis algorithms and tests can be prioritized and selectively conducted on the network data. The priority of each test can be selected on any basis. The priority of analysis can be selected by a user and/or can be dynamically selected by an apparatus such as embedded code in a processor or computer instructions loaded onto a processor. For example, tests may be prioritized based on at least one of whether the test has been run on a particular data type or transaction, whether the test has been conducted during a predetermined time period, the layer in which the test analyzes (e.g., refer to FIG. 1), the likelihood of finding errors, and whether the test is lower in network system priority (e.g., performance tests may be lower in priority than basic functionality tests).

Figure 11:
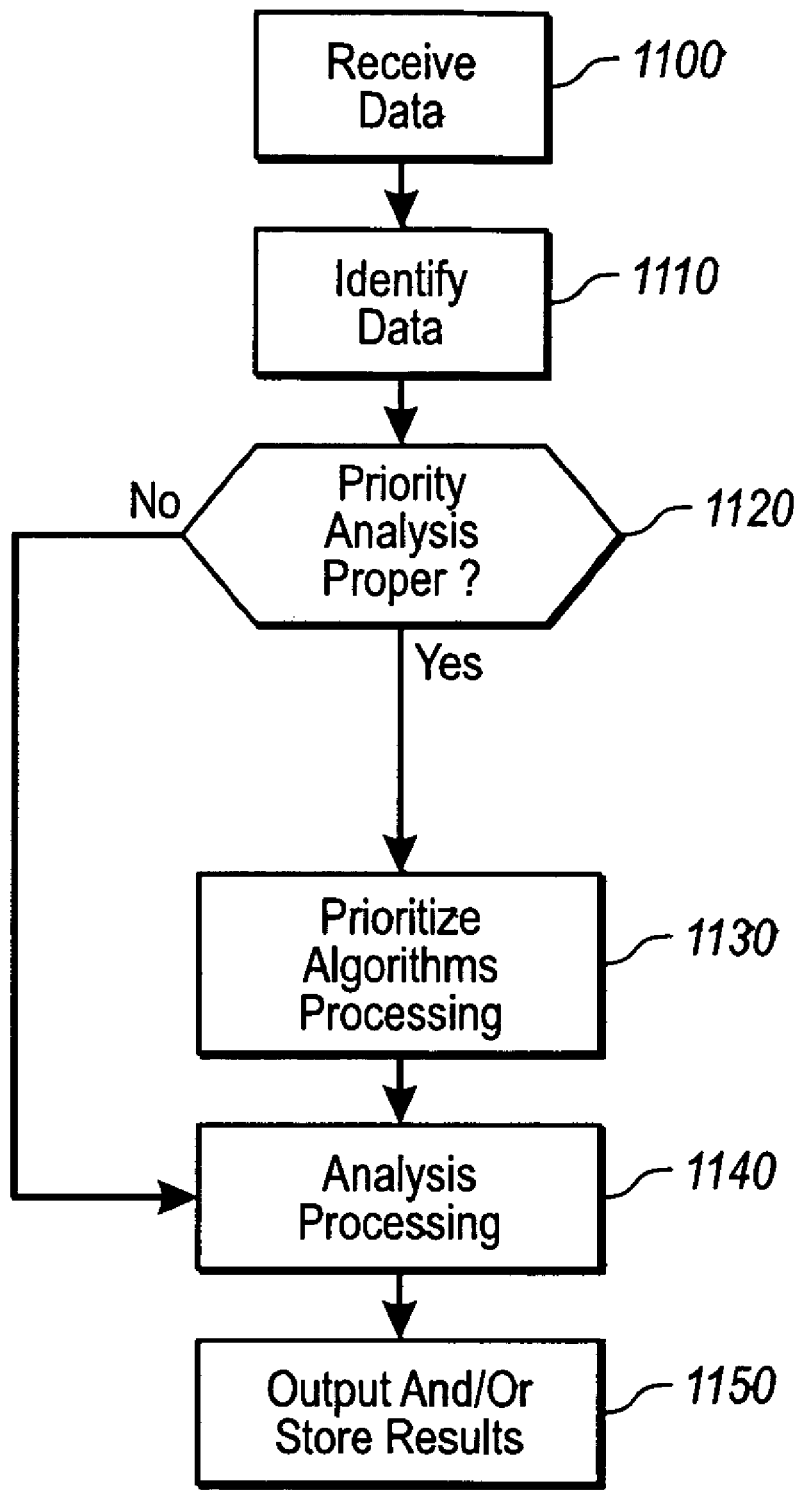
FIG. 11 is a block diagram illustrating a method of performing priority analysis on a data stream according to an example embodiment of the present invention.

For example, referring now to FIG. 11, a block diagram illustrating a method of performing priority analysis of network data is shown according to an example embodiment of the present invention. Network data from a network data stream, or a copy representing network data from the network data stream, can be received (1100). Identification can be assigned to the network data (1110). It can be determined whether priority analysis is proper and should be implemented (1120). Priority analysis can be proper when, for example, a status signal from a memory buffer indicates an amount of data stored in the memory buffer is above a priority threshold, or priority analysis has been selected by a user.

In the instance that priority analysis is not proper, the network data can be forwarded to an appropriate analysis processor for analysis (1140). Analysis can be conducted on the network data (1140) and a result of the analysis can be stored in memory or presented to a user (1150). In the instance that the signal from the memory buffer is proper, the analysis can be prioritized (1130) and the prioritized analysis can be conducted (1140) on the network data. The network data, a description of any prioritization of tests, and/or a result of the analysis can be stored in memory or presented to a user (1150).

Prioritization of the different tests and analysis algorithms can be based on a variety of factors. For example, priority may be based on at least one of whether the test has been run on a particular network data type or transaction in a given time frame, and whether the test is lower in system priority, for example.

Memory in a processor can be compiled to keep track of information related to processes conducted and the memory can be queried and updated using any appropriate means (e.g., an analysis processor or a network processor) in an analysis system implementing the methods of the present invention. Moreover, different analysis processors in a demultiplexed system can prioritize tests differently and maintain separate priority LUTs. Different tests can also be prioritized differently for different transactions, protocols, mechanisms, and network conditions.

Apparatuses for practicing the methods for prioritizing and analyzing data of the present invention can be embodied in various configurations and process sequences. For example, referring to FIG. 12, a system 1200 for prioritizing and analyzing data received from a network 1210 is shown according to an example embodiment of the present invention. A memory buffer 1220 can receive a data stream, or a copy of the network data stream, transferred from a source 1230 to a destination 1240 in the network 1210. The memory buffer 1220 can forward the network data in turn to an analysis processor 1250. A memory buffer status signal can be received by the analysis processor 1250 indicating an amount of network data stored in the memory buffer 1220. The analysis processor 1250 can compare the signal to a priority threshold representing, for example, an amount of data at which point prioritization of tests will be implemented.

The analysis processor 1250 can include a priority LUT stored in memory and in the instance that the signal from the memory buffer 1220 is greater than the priority threshold, the priority LUT can be queried to determine an amount of prioritization, of analysis that should be conducted for the particular transaction. The analysis processor 1250 can conduct the appropriate tests for errors and store a result of the tests in memory and/or present results of the tests along with an indication of any tests not conducted due to prioritization of the tests to a user.

Referring to FIG. 13, an illustration of an example priority LUT 1300 is shown listing examples of tests and analysis algorithms that can be conducted on a transaction or piece of network data. The priority LUT 1300 can be specific to a particular transaction, piece of network data, or analysis processor, or can be a general priority LUT 1300 to be queried for every transaction or piece of network data. The priority LUT 1300 can include additional associated data structures indicating historical outcome of each test. The priority LUT 1300 can be a static table, developed by user input, or a dynamically generated table updated and maintained by the analysis system itself.

As illustrated, the priority LUT 1300 can include historical data of whether each test has been passed, failed, or not observed. Thus, the tests can be prioritized, for example, such that tests that have not been observed and tests that have historically failed are prioritized above tests that historically have been completed and have not found errors in the network data tested. Like the filter LUT, the priority LUT 1300 can be cleared at least in part at any interval (e.g., each day) so that the historical outcome of every test will be determined at least at some determined interval.

In addition, the priority LUT 1300 can include a prioritization of different tests based on the layer of analysis or how critical detection of errors is to the operation of the network. The priority LUT 1300 can also include multiple priority LUTs for different sets of tests that will be excluded. Different levels of priority analysis can be implemented depending on the amount of data in a single memory buffer, or the amount of data stored in multiple memory buffers.

Figure 12:
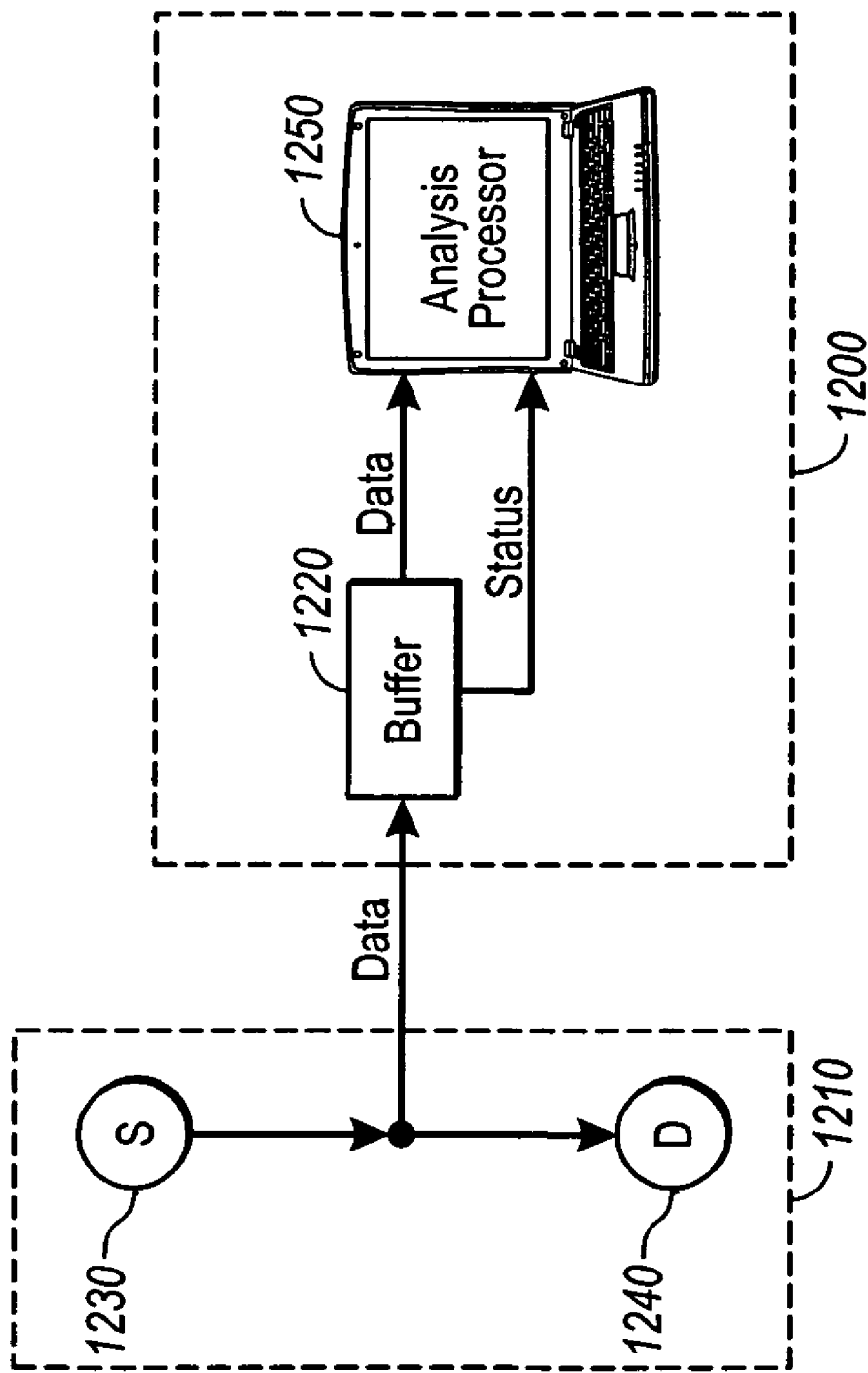
FIG. 12 illustrates a system for prioritizing and analyzing data received from a network according to an example embodiment of the present invention.

According to other example embodiments of the present invention the above described prioritization of tests can be combined with other aspects of the present invention discussed herein (e.g., using system 1200 in FIG. 12 in some instances). For example, priority analysis can be combined with filtering techniques and/or embodiments including demultiplexing of network data to multiple analysis processors.

Figure 14:
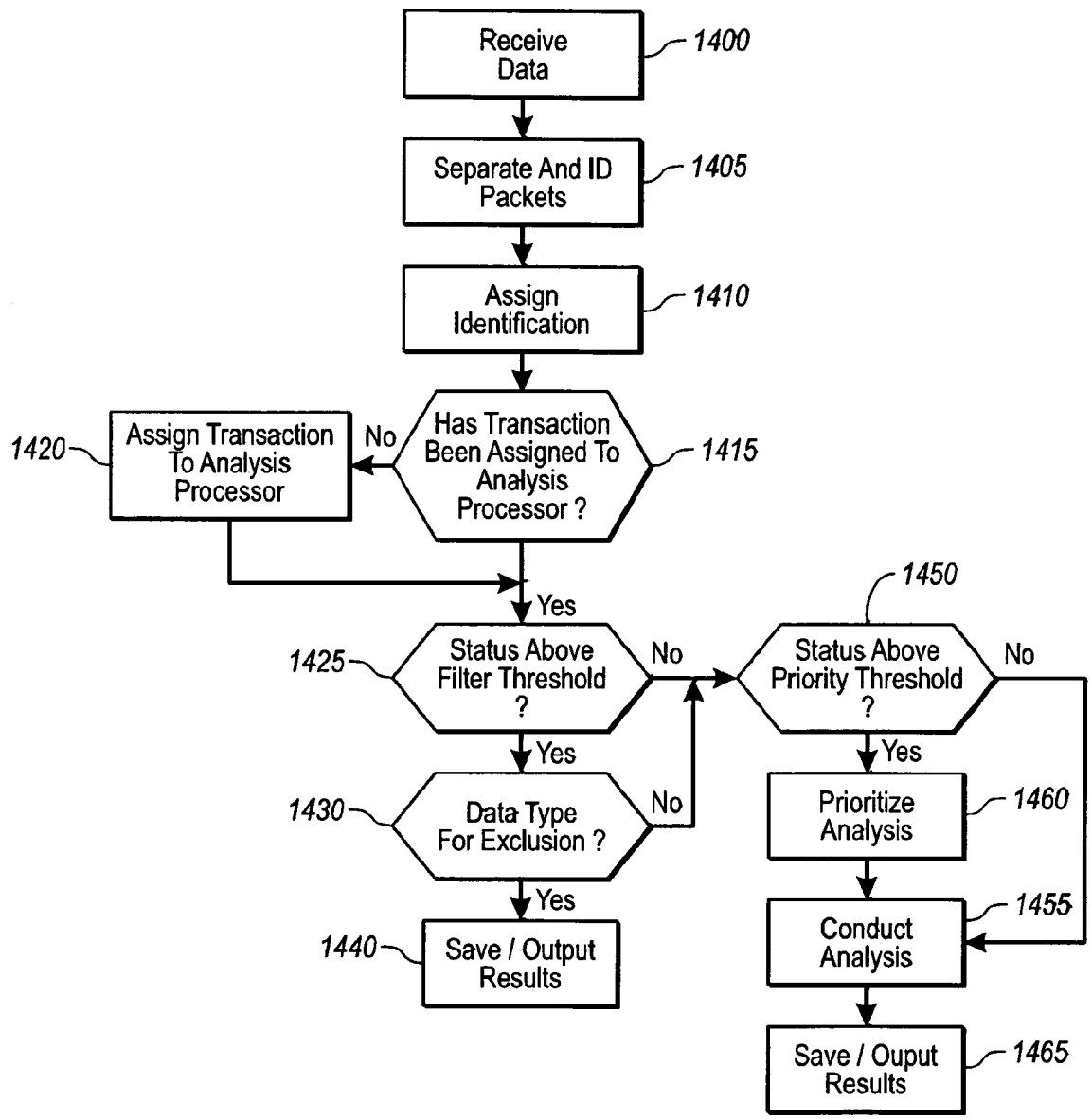
FIG. 14 is a block diagram illustrating a method for analyzing data combining at least filtering techniques, priority analysis techniques, and demultiplexing of a data to multiple analysis processors aspects of example embodiments of the present invention.

According to an example embodiment of the present invention a network method and apparatus for practicing such methods can include filtering techniques, prioritized analysis techniques, and demultiplexing of data to multiple analysis processors, which are aspects of several embodiments of the present invention discussed herein. For example, referring to FIG. 14, a block diagram illustrating a method for analyzing network data is shown according to an example embodiment of the present invention. A network data stream, or a copy of the network data stream, can be received (1400). Network data relating to a particular transaction can be separated and the identification information can be extracted (1405). The network data can be assigned an identification 1410 and it can be determined whether the identification has been assigned to an analysis processor (1415). The network data can be prepared and additional fields can be used. Also, portions of the network data, such as a payload or fields can be excluded.

In the instance that the identification has not been assigned to an analysis processor, the identification can be assigned to an analysis processor (1420). It should be understood that any criteria can be used to assign the TID to an analysis processor such as, for example, assigning the TID to the analysis processor coupled to a memory buffer with the lowest amount of data in its queue, assigned based on the type of transaction the network data belongs to, or assigned based on the type of analysis conducted by the analysis processor.

After the appropriate analysis processor has been assigned, a status signal indicating an amount of data stored in a memory buffer coupled to the assigned analysis processor can be compared to a filter threshold (1425). The status signal, as previously stated, may be a binary flag indicating whether the buffer can receive additional data. The filter threshold can equal an amount of data stored in a memory buffer at which point the analysis system will start to remove certain packets or transactions of data from analysis processing. In the instance that the amount of data stored by the memory buffer is above the filtering threshold, it can be next determined whether the network data is of the type selected for exclusion from analysis (1430). In the instance that the network data is of the type for exclusion the network data can be excluded from analysis processing, and the network data, or an indication that the network data was excluded from analysis, can be saved to memory or presented to a user (1440). In the instance that the network data is saved to memory, the network data can also be later retrieved for subsequent analysis.

In the instance that the status signal indicating amount of data in the FIFO is not above the filtering threshold or the network data is not of the type of data selected for exclusion, the amount of data stored in the memory buffer can be compared to a priority threshold (1450). The priority threshold can be an amount of data stored in the memory buffer at which point the analysis will be conducted on data according to its priority relative to other tests. It should be appreciated that the priority threshold can be checked prior to the filtering threshold or the thresholds can be staggered so that a lower threshold is compared prior to a larger threshold requiring that only one threshold to be queried in the instance that the status of the memory buffer is lower than the first threshold. Multiple levels of prioritization and filtering can also be implemented.

In the instance that the status signal indicating an amount of data stored in the memory buffer is less than the priority threshold, the network data packet can be analyzed by the assigned analysis processor (1455). In the instance that the status signal is greater than the threshold, for example indicating that an amount of data stored in the assigned memory buffer is greater than the priority threshold, the number of tests conducted, layers of analysis, or level of analysis can be prioritized (1460) and analysis can be conducted at this according to the prioritization of analysis (1455). The results of the analysis can then be saved to memory or presented to a user (1465).

Figure 15:
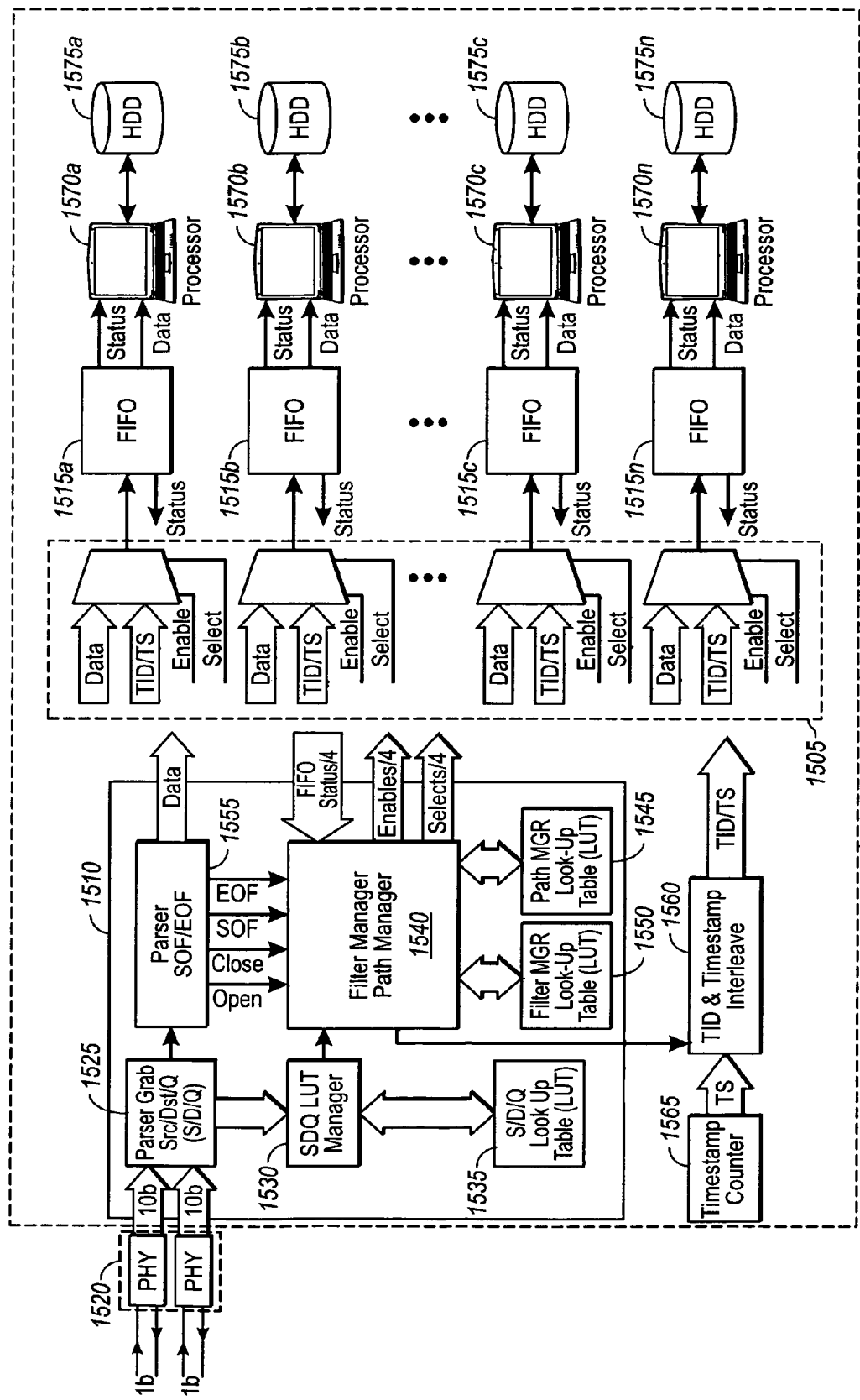
FIG. 15 illustrates a system for analyzing network data including a transaction distribution module implementing filtering and priority analysis techniques according to an example embodiment of the present invention.

Example embodiments of network analysis apparatuses implementing filtering techniques and/or prioritized analysis, and/or demultiplexing and redirection of data to multiple analysis processors can be embodied in various configurations and sequences of mechanisms for conducting the different processes. For example, referring to FIG. 15, an illustration of a system 1500 for analyzing network data including a transaction distribution module 1505 implementing filtering and priority analysis techniques is shown according to an example embodiment of the present invention. The system for analyzing network data 1500 can include a network processor 1510 coupled to the transaction distribution module 1505 where each output of the distribution module 1505 can be coupled to a different FIFO memory buffer 1515*a-n*, analysis processor 1570*a-n*, and storage hard disk drive 1575*a-n*.

In operation, a packet of data can be received from a bidirectional network data stream by two physical connections 1520 coupled to the network processor 1510. The network processor 1510 can include logic for performing each of the described functions. The network processor 1510 can include a S/D/Q parser 1575 that receives network data and extracts S/D/Q information from fields of the packet. The S/D/Q information can be communicated to a S/D/Q LUT manager 1530. The S/D/Q LUT manager 1530 can query a S/D/Q LUT 1535 and assign a TID to the network data based on the results of the S/D/Q LUT query. The S/D/Q manager 1530 can communicate the TID to a filter and path manager 1540. The functions of the filter and path manager 1540 can be accomplished by a single processor as shown, or can be accomplished by multiple processors or logic devices including executable logic for carrying out the described functions. The filter manager and path manager 1540 functionality can also be programmed into the network processor 1510. The filter and path manager 1540 can receive signals indicating the status of at least one of the FIFO memory buffers 1515a-n coupled to corresponding analysis processors 1570a-n. The filter and path manager 1540 can compare the FIFO status signal to a stored or received filter threshold to determine whether to implement filtering techniques. In the instance that that status signal is greater than the threshold, the filter and path manager 1540 can compare the network data or TID to information stored in a filter manager LUT 1550 to determine whether the packet or transaction is of the type selected for exclusion from analysis. The filter and path manager 1540 can implement packet filtering or transaction filtering depending on the FIFO status signal or on any other basis. The filter manager 1540 can exclude repetitive packets or repetitive transactions, or filter by S/D/Q identification. It will not, however, filter response packets with a bad error status in the filter LUT 1550.

The filter and path manager 1540 can also receive the TID from the S/D/Q LUT manager 1530 and query a path manager LUT 1545 to determine whether the TID has been assigned to a particular path of the distribution module 1505. The path manager 1540 can ensure that all packets and primitives which belong to the same transaction are sent to the same analysis processor (at least one of 1570a-n) connected to an output path of the distribution module 1505. The path manager 1540 can transmit control signals, such as enable and select signals, coordinated with signals received from a SOF/EOF parser 1555 to control the path to which the network data is routed and the duration for which the path is established. The TID can be routed to a TID and TS interleaver 1560, which receives a TS signal from a TS counter 1565. The interleaver 1560 can route the interleaved TS and TID to an input of the transaction distribution module 1505 followed by the network data packet from the SOF/EOF parser 1555. Each channel of the distribution module 1505 can receive a control signal allowing for, transfer of the packet of data to the particular processor (at least one of 1570a-n) assigned to the transaction.

An analysis processor 1570a-n can also receive a status signal from its corresponding FIFO memory buffer 1515a-n indicating, for example, the amount of data stored in the FIFO's queue. Based on the status signal received from the FIFO memory buffer 1515a-n, the analysis processor 1570a-n can query a priority LUT and prioritize the number of tests, algorithms, and/or the layers of analysis conducted on the network data. For example, expert analysis software can use at least one LUT to prioritize tests that are not observed yet, or are not as critical to the operation of the network. If the FIFO 1515a-n is reaching its capacity, the analysis processor 1570a-n can implement priority analysis so that testing is intelligently prioritized. A different priority LUT can be maintained for each source and destination pair.

The analysis processor 1570a-n can also provide the user with constant status regarding the FIFO 1515a-n fullness as well as filtering methods used and prioritization of tests being conducted. If the user wants less filtering, he can reduce the amount of processing (e.g., less expert analysis), add more processors (e.g., more demultiplexing), or use more powerful processors. Similarly, the analysis processors 1570a-n and the network processor 1510 can communicate with each other such that if the user wants more processing (e.g., more expert analysis and less prioritizing of tests), the user can increase the amount of filtering, add more processors, or use-more powerful processors.

The analysis processors 1575a-n can be coupled to HDDs 1575a-n for storage of network data associated with transactions that have errors, protocol violations, or other anomalies. An IT manager can further analyze the details of these transactions days after they occur. The analysis software can prioritize tests so that all tests are eventually run on all source and destination pairs, but some tests can be run less frequently than other tests as desired. The analysis processors 1570a-n can store the results of the analysis conducted in the HDDs 1575a-n and/or output the results of the analysis to a display or printer, for example.

5. Example Embodiments Scaling the Present Invention

The present invention can also be scaled in several different aspects so as to remove bottle necks from the network data analysis system. For example, the present invention can be scaled at the input level, the network processing level, and the distribution module level. Scaling at the network analysis level by adding analysis processors is discussed above.

Another advantage of scaling various embodiments of the present invention is for fault tolerancing. For example, where a network data analysis system includes multiple inputs, network processors, distribution modules, and/or multiple analysis processors allowing for several channels for network data, the network data analysis system can redistribute the routing and processing burden between any of these components in the case of failure of any of the components. Any of the components of the network analysis system can be in communication to detect failure of a component of the system and dynamically adjust routing of network data to insure that the network data is received by an analysis processor or storage medium and properly analyzed.

Figure 16:
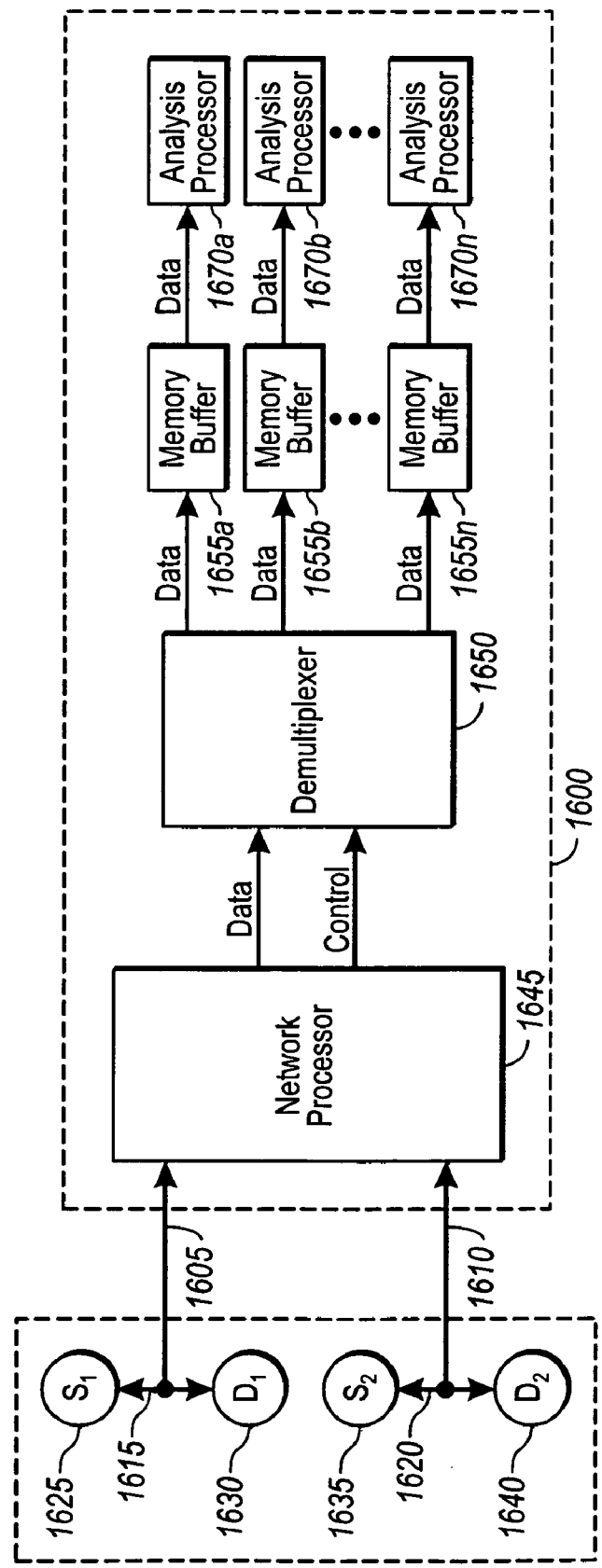
FIG. 16 illustrates a network processing system where the network processor includes two network data inputs according to an example embodiment of the present invention.

The present invention can be scaled at the input level by providing multiple input channels or ports to the network processing system. A network can be accessed at multiple links, and network data representing multiple data streams transmitted across the network can be received by the network analysis system simultaneously. For example, referring to FIG. 16, a network processing system 1600 is shown according to an example embodiment of the present invention. The network processing system 1600 can include a first input 1605 to the network analysis system 1600 that receives network data from a first communication link 1615 between a first source 1625 and a first destination 1615. Similarly, a second input 1610 to the network analysis system 1600 receives network data from a second communication link 1620 between a second source 1635 and a second destination 1640. It should be appreciated that the same network link can also be accessed in two locations and the network data can represent at least a portion of the same or different data streams.

The network data can be received by a network processor 1645 that provides network data and a control signal to a distribution module 1650. The distribution module 1650 can receive the network data and control signal from the network processor 1645 and route the network data to at least one memory buffer 1655a-n coupled to an analysis processor 1670a-n. At least one memory buffer 1655a-n receives the network data and provides the network data in turn to its corresponding analysis processor 1670*a-n*. Each input 1605 and 1610 can also be referred to as ports.

Figure 17:
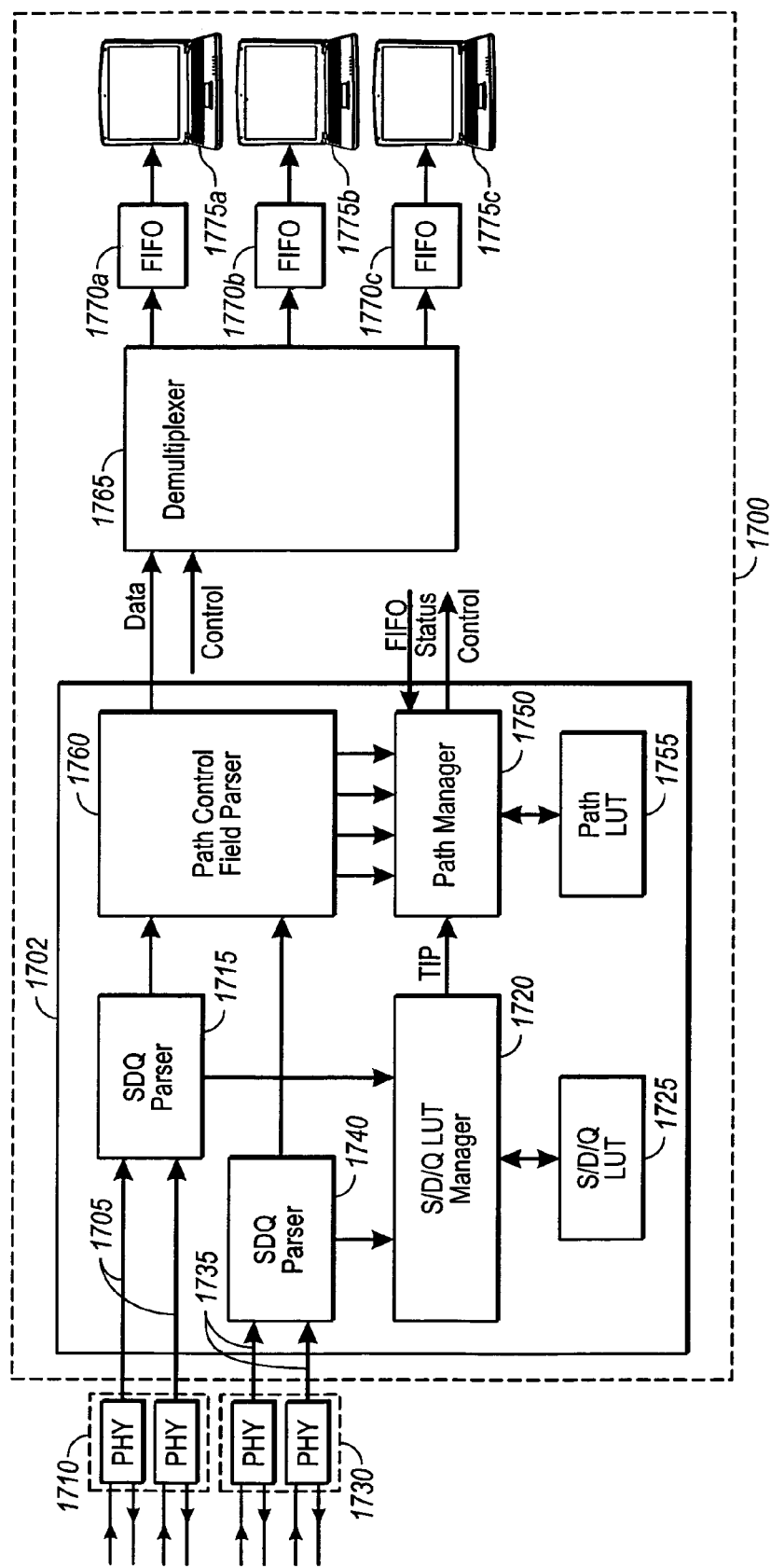
FIG. 17 illustrates an example embodiment of the present invention where the network analysis system includes multiple inputs for receiving network data.

Referring now to FIG. 17, an example embodiment of the present invention is shown where a network analysis system 1700 includes multiple inputs to a network processor 1702 for receiving network data. A first input 1705 to the network analysis system can include two physical connections 1710 to a data transmission link configured to tap and receive network data representing at least a portion of a data stream transmitted across the network data transmission link. The network data can be received by a first S/D/Q 1715 parser that can extract S/D/Q fields from the network data identifying the network data by, for example, transaction, source, destination, type of data, or other appropriate identification. The S/D/Q fields from the first S/D/Q parser 1715 can be received by S/D/Q LUT manager 1720 that queries a S/D/Q LUT 1725 and assigns a TID to the network data.

Similarly, a second input 1735 to the network analysis system 1700 can include two physical connections 1730 to another data transmission link. The second input 1735 can be configured to receive network data representing at least a portion of a data stream transmitted across the second data transmission link. The network data can be received by a second S/D/Q parser 1740 that extracts S/D/Q fields from the network data identifying the network data. The S/D/Q fields from the second S/D/Q parser 1740 can be received by the S/D/Q LUT manager 1720 that can query the S/D/Q LUT 1725 and assign a TID to the network data. The TID can be received by a path manager 1750 that queries a path LUT 1755 and communicates with a path control field parser 1760 and a distribution module 1765 to route the network data received by both inputs to an appropriate memory buffer 1770*a-n* coupled to a corresponding analysis processor 1775*a-n*. A serializer-deserializer can also be used to serialize data received from multiple connections in a single data stream input to the analysis system 1700.

Figure 18:
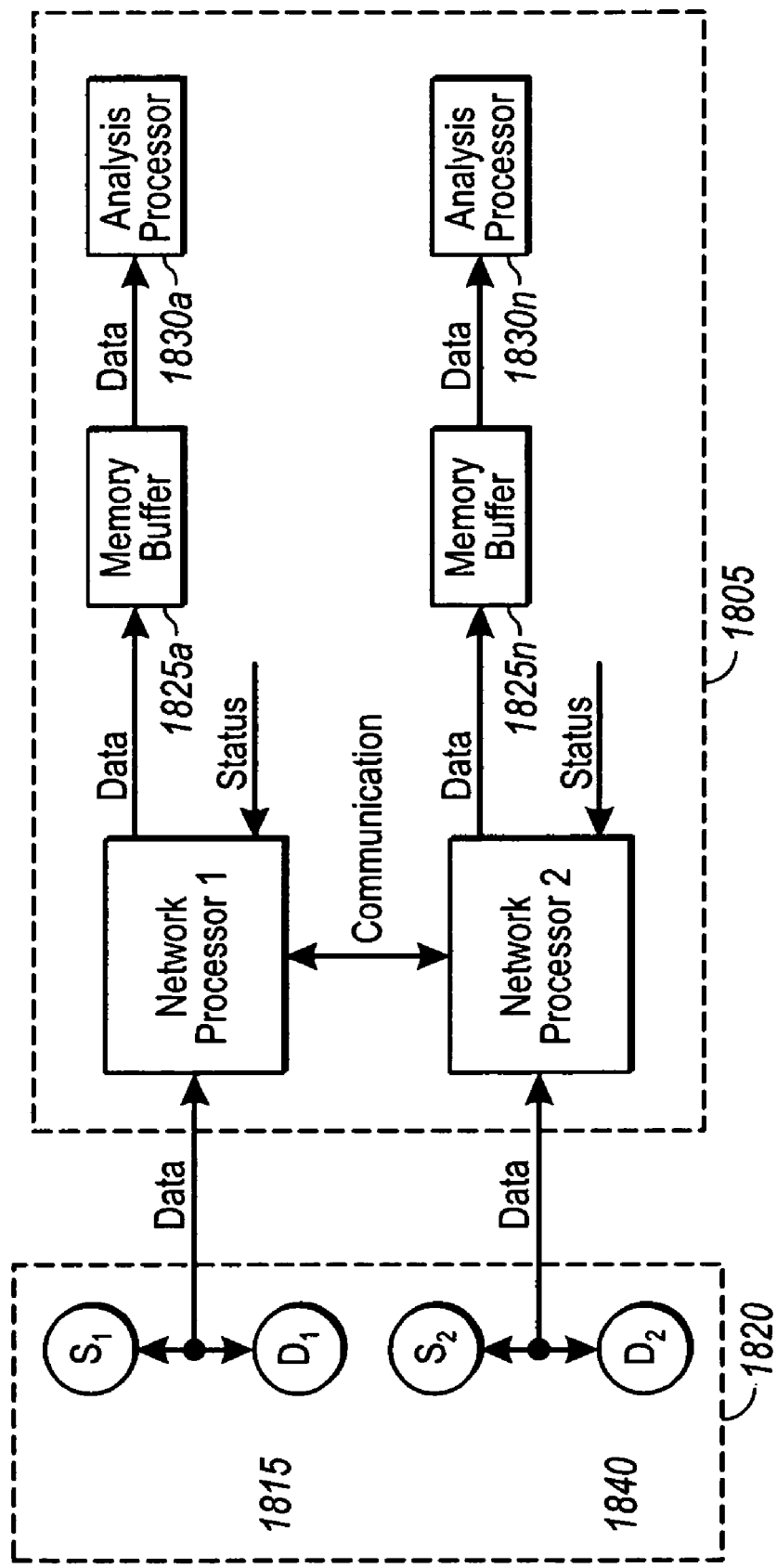
FIG. 18 illustrates an example embodiment of the present invention where multiple network processors have been implemented.

Referring now to FIG. 18, an example embodiment of the present invention is shown where multiple network processors 1800*a-n* have been implemented. The network processors 1800*a-n* can be part of the same network analysis system 1805, each network processor 1800*a-n* receiving the same or different network data.

For example, a first network processor 1800*a* can receive network data representing at least a portion of a data stream transmitted between a first source 1810 and a first destination 1815 in a network 1820. The network data can be received by a memory buffer 1825*a* from the first network processor 1800*a* and the memory buffer 1825*a* can provide the network data in turn to a corresponding analysis processor 1830*a* Similarly, a second network processor 1800*n* can receive network data representing at least a portion of a data stream transmitted between a second source 1835 and a second destination 1840 in the network 1820 or different networks. The network data can be received by a second memory buffer 1825*n* and the network data can be provided in turn to a second analysis processor 1830*n* for analysis of the network data. The first network processor 1800*a* can be coupled to the second network processor 1800*n* so that network data, transaction data, control data, memory buffer status data, and/or analysis data can be shared between the network processors 1800*a-n*.

Figure 19:
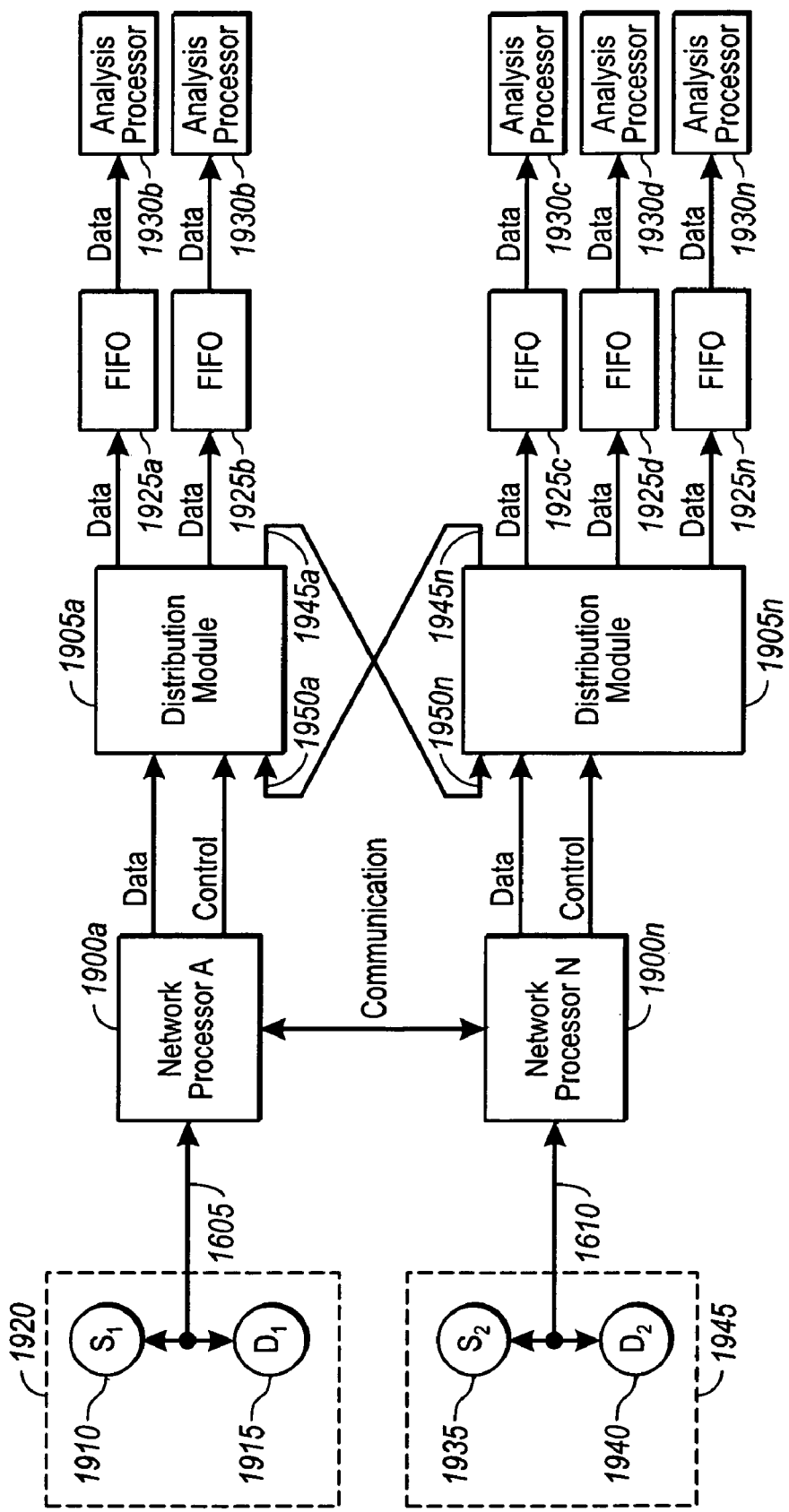
FIG. 19 illustrates an example embodiment of the present invention implementing multiple network processors and multiple network data distribution modules.

Referring to FIG. 19, an example embodiment of the present invention is shown implementing multiple network processors 1900*a-n* and multiple network data distribution modules 1905*a-n* (e.g., FPGAs). A first network processor 1900*a* receives network data representing at least a portion of a data stream transmitted between a first source 1910 and a first destination 1915 in a first network 1920. The network data can be received from the network processor 1900*a* along with a control signal by a first distribution module 1905*a*. The first distribution module 1905*a* can route the network data to at least one of its outputs coupled to a corresponding FIFO memory buffer 1925*a-b* and analysis processor 1930*a-b*.

Similarly, the second network processor 1900*n* receives network data representing at least a portion of a data stream transmitted between a second source 1935 and a second destination 1940 in a second network 1945. The network data can be received by a second network data distribution module 1905*n* from the second network processor 1900*n* along with a control signal. The second distribution module 1905*n* can route the network data to at least one of its outputs that is coupled to a corresponding FIFO memory buffer 1925*c-n* and analysis processor 1930*c-n*.

Any of the network processors and analysis processors can be coupled for communication to another network processor (or logic device) to share control data and/or network data. For example, the first and second network processors 1905*a* and 1905*n* can share information related to transactions, LUTs, network errors, distribution module control data, memory buffer status data, and analysis control data. Each distribution module 1905*a-n* can also include a connection from at least one output (e.g., 1945*a-n*) to the input (e.g., 1950*a-n*) of another distribution module 1905*a-n*. For example, as shown in FIG. 19, an output 1945*a* of the first distribution module 1905*n* can be coupled to an input 1950*n* of the second distribution module 1905*n*. Similarly, an output 1945*n* of the second distribution module 1905*n* can be coupled to an input 1950*a* of the first distribution module 1905*a*. Accordingly, each network processor 1900*a-n* can transmit data to any of the analysis processors 1900*a-n* coupled to either distribution module 1905*a-n* by coordinating control information with the other network processor 1900*a-n* to establish an appropriate path of both distribution modules 1905*a-n*.

Allowing transfer of network data as well as control information between the network processors 1900*a-n* and distribution module channels can be advantageous for many reasons. For example, this embodiment may allow for sampling data as it passes through different channels and protocols. When analyzing data at the network layer it may be advantageous to analyze data both prior to a protocol conversion and following a protocol conversion. In this manner, the first data stream 1605 (e.g., a Fibre Channel data stream) can be received (e.g., by network processor 1900*a*) prior to the network data stream 1605 undergoing a protocol conversion (e.g., Fibre Channel to Ethernet). The second data stream 1610 (e.g., an Ethernet data stream) can be received (e.g., by network processor 1900*n*) following the second data stream 1610 undergoing the protocol conversion (e.g., Fibre Channel to Ethernet). According to this embodiment of the present invention the first data stream 1605 can be directed to the same analysis processor as the second data stream 1610 by directing one of the network data streams to the other distribution module (e.g., using output 1945*a* to direct the first stream 1605 from distribution module 1905*a* to input 1950*n* of distribution module 1905*n*). Thus, the network data may have originated in the same form, but a "before and after" depiction can be received by any of the analysis processors 1930*a-n* coupled to either network processor 1900*a-n* by the distribution modules 1905*a-n*. Each network processor 1900*a-n* can also receive a different type of signal from a different type of link and include different hardware than the other network processor 1900*a-n* for comparing data as it is transferred through a plurality of communication nodes (e.g., a router or switch) and types of links.

The embodiment depicted in FIG. 19 can also be used for load balancing. For example, in the instance that the FIFO memory buffers 1925*a-b* coupled to network processor 1900*a* are becoming full, but FIFO memory buffers 1925*c-n* have additional capacity that they can receive, the network processor 1900*a-n* can coordinate transfer of data from output 1945*a* of distribution module 1905*a* to input 1950*n* of distribution module 1905*n*. In this manner the load differential can be balanced between the FIFO memory buffers 1925*a-b* coupled to distribution module 1905*a* and the FIFO memory buffers 1925*c-n* coupled to distribution module 1905*n*. Load balancing can be conducted at any scale. Data can be routed from one distribution module to another in a series fashion such that the network data is received down stream at the desired analysis processor by being passed from one distribution module to another.

According to example embodiments of the present invention, the functions of each network processor can also be divided between multiple processors as well as multiple logic devices. Front-end diversion, preparation of network data, and analysis using a logic-device may also be implemented.

Example embodiments of the present invention can also include additional front-end diversion of data by additional logic devices, or by other means. For example, a programmable logic device (PLD) such as a FPGA can be implemented to further divert the network data stream into multiple network processors. The functions of example embodiments of the present invention can also be divided between several different devices in many different configurations. For example, a FPGA, or a processor, can assign identification and perform the S/D/Q LUT manager functions; and any number of network processors, or other processors, can share the filter manager and path manager functions as well as other functions described herein.

Figure 20:
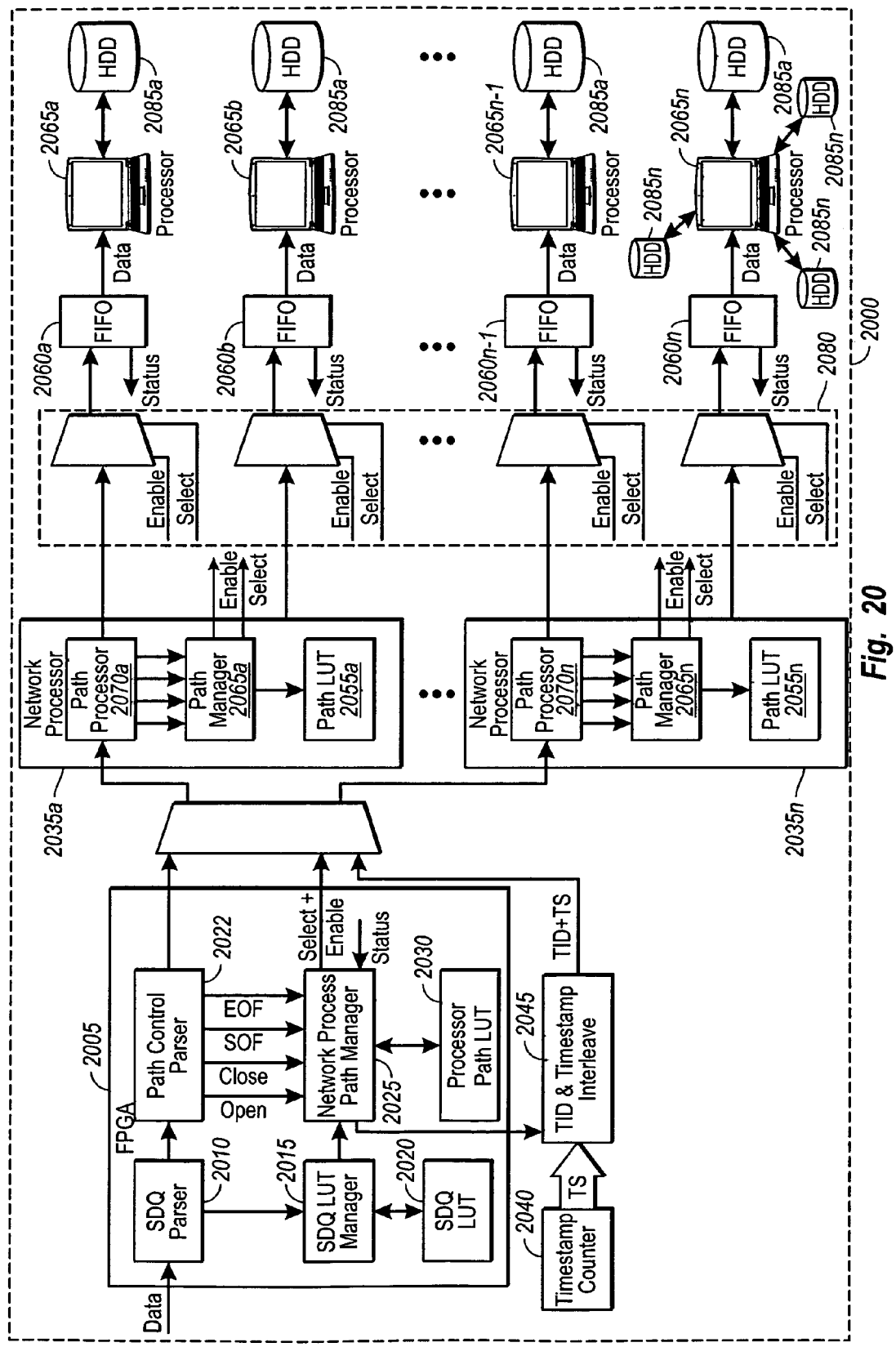
FIG. 20 illustrates a system for analyzing a network data stream implementing a front-end programmable logic device for diverting network data between two network processors according to an example embodiment of the present invention.

For example, referring now to FIG. 20, a system 2000 for analyzing a network data stream is shown according to an example embodiment of the present invention. Network data can be received by a FPGA 2005. The FPGA 2005 can include a S/D/Q parser 2010 that extracts S/D/Q information from a packet of network data and forwards the information to a S/D/Q LUT manager 2015 that accesses a S/D/Q LUT 2020 and assigns a TID to the packet. The TID can be sent to network processor path manager 2025 that accesses a network processor path LUT 2030 and directs the packet to at least one of the network processors 2035*a-n*. An interleaver 2045 can interleave the TID with a TS received from a TS counter 2040. The interleaved TID and TS can be transmitted to the appropriate network processor 2035*a-n* along with the packet of data.

The appropriate network processor 2035*a-n* receives the interleaved TID/TS and network data. The interleaved TID/TS and network data is forwarded to at least one path manager 2065*a-n*. The path manager 2065*a-n* receiving the network data accesses a path LUT 2055*a-n* and identifies an appropriate FIFO memory buffer 2060*a-n* and analysis processor 2065*a-n* assigned to the TID for receiving and analyzing the network data along with other network data belonging to the same transaction. A path control parser 2070*a-n* can communicate with the path manager 2065*a-n* to enable and select channels of a distribution module 2080 so as to route the network data to the appropriate FIFO memory buffer 2060*a-n* and analysis processor 2065*a-n*.

The appropriate FIFO memory buffer 2060*a-n* can receive the network data and act as a data buffer allowing for the corresponding analysis processor 2065*a-n* to access and analyze the network data in turn. Results of the analysis or other data can be stored in a database or a HDD 2085*a-n*. Each analysis processor 2065*a-n* can be coupled to a plurality of HDDs 2085*a-n*. HDDs are generally fairly cheap and can store a relatively large amount of data. The speed of accessing information stored on a HDD can also make it advantageous to have multiple HDDs coupled to a single analysis processor, such as analysis processor 2085*n*, which is coupled to four HDDs 2085*n*. For example, where a single analysis processor is coupled to five 200 gigabyte HDDs the analysis processor has access to store and receive a terabyte of data. These HDDs can be configured in any fashion, for example according to any RAID standard.

Figure 21:
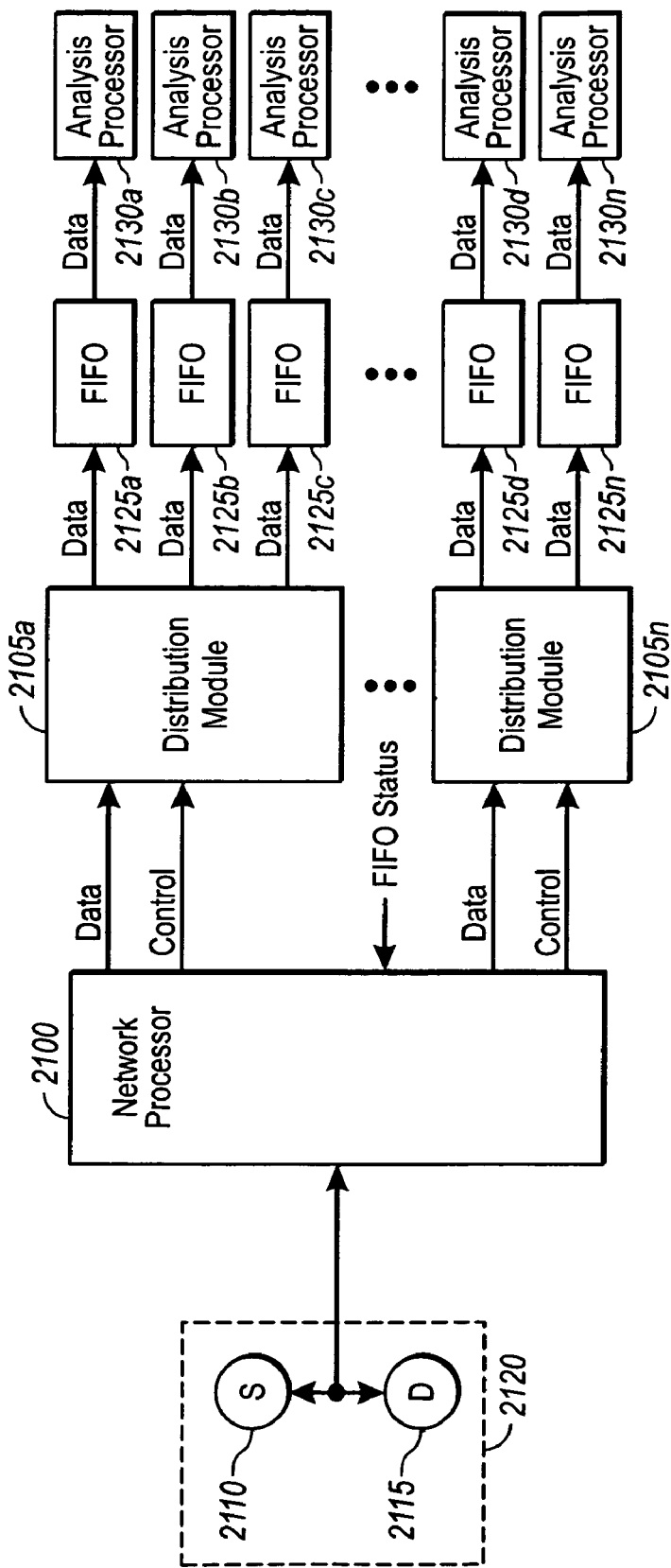
FIG. 21 illustrates a network analysis system including a single network processor that distributes network data between two distribution modules oriented in parallel with respect to the network processor.

According to example embodiments of the present invention, a network processor apparatus can include multiple distribution modules coupled in series and/or coupled in parallel to a network processor. For example, FIG. 21 illustrates an example embodiment of the present invention where a single network processor 2100 is coupled to multiple distribution modules 2105*a-n*. The network processor 2100 receives network data representing at least a portion of a data stream transmitted between a source 2110 and a destination 2115 in a network 2120. A first distribution module 2105*a* receives at least a portion of the network data from the network processor 2100 along with a first control signal. Similarly, a second distribution module 2105*n* receives at least a portion of the network data from the network processor 2100 along with a second control signal. The distribution modules 2105*a-n* can be coupled to multiple FIFO memory buffers 2125*a-n* and analysis processors 2130*a-n* for analyzing the network data. In this manner analysis of the network data can be distributed across multiple parallel oriented distribution modules 2105*a-n* and associated analysis processors 2130*a-n* from a single network processor 2100.

Figure 22:
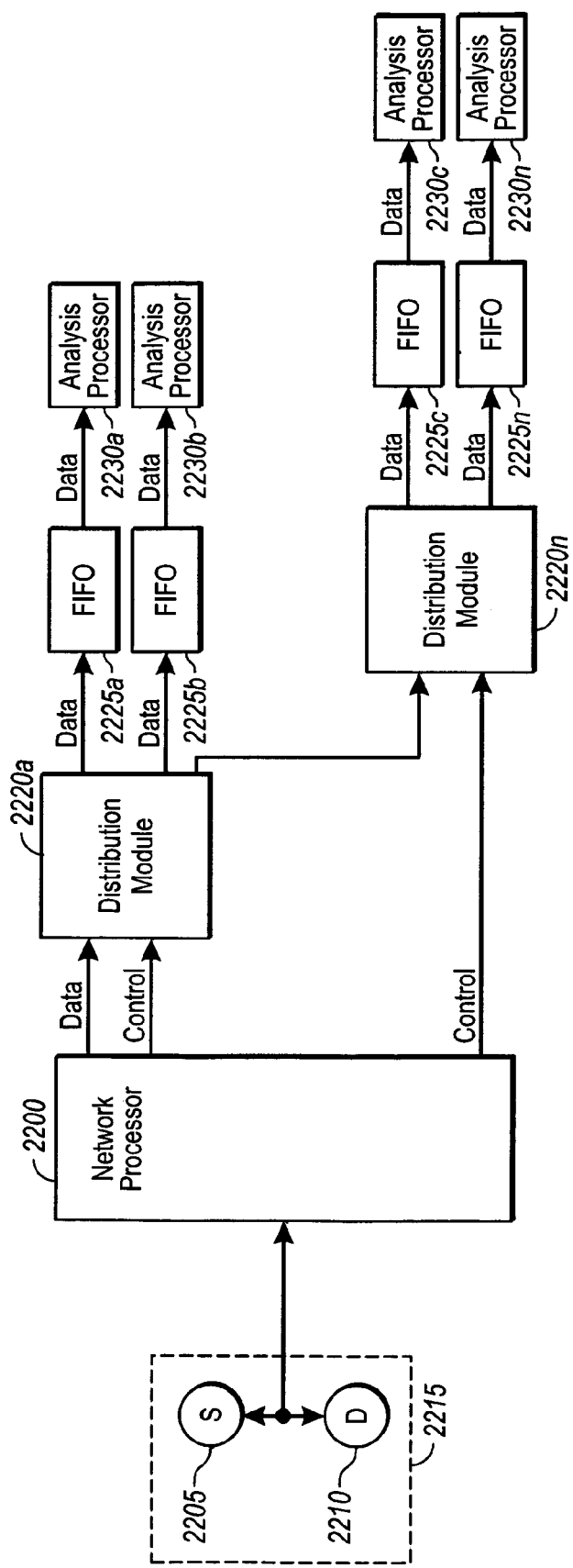
FIG. 22 illustrates a network analysis system including a single network processor that distributes network data between two distribution modules oriented in series with respect to the network processor.

Referring now to FIG. 22 an example embodiment of the present invention is shown where a single network processor 2200 receives network data representing at least a portion of a data stream transmitted between a source 2205 and a destination 2210 in a network 2215. A first distribution module 2220*a* can receive the network data and a control signal from the network processor 2200 and route the network data to any of a plurality of memory buffers 2225*a-b* and corresponding analysis processors 2230*a-n* and/or a second distribution module 2220*n* coupled to an output of the first distribution module 2220*a*. The second distribution module 2220*n* can receive the network data from the first distribution module 2220*a* in the instance that the network data provided to the first distribution module 2220*a* is routed to the output coupled to the second distribution module 2220*n*. The second distribution module 2220*n* can receive a second control signal from the network processor 2200 and route the network data to an appropriate FIFO memory buffer 2225*c-n* and analysis processor 2330*c-n* based on the second control signal. In this manner, analysis of the network data can be distributed across multiple analysis processors 2230*a-n* coupled to multiple distributions modules 2220*a-n* oriented in series from a single network processor.

Different modules containing different combinations of different aspects of the present invention can be designed in a single analysis system, or in an overall analysis scheme. An analysis scheme can implement many different levels of analysis for different communication links in a single network or multiple networks depending on the level of concern regarding the particular link, or links. An analysis scheme or system can include two or more modules describing a set of parameters implementing different aspects of the present invention at different levels. For example, in the instance that an analysis scheme or system includes three modules, for example a high level module, a medium level module, and a low level module, different aspects of the present invention can be combined in different levels as desired.

A high level module can include, for example, a high level of demultiplexing, scaling, and a high level of processing bandwidth. The high level module can implement hardware designed to handle such a large amount of data and processing bandwidth as described in many embodiments herein. The high level module can analyze the network data at many layers of analysis and implement a low level of filtering and prioritized analysis. The high level module can analyze data using many tests at many layers of analysis at or approaching real-time speeds to insure that as many errors as possible can be detected immediately, or as soon as possible.

A middle level module, can include, for example, a lower level of demultiplexing and scaling and can include a lower processing bandwidth than the high level module. The middle level module can implement filtering and prioritized analysis to allow for a lower level of processing bandwidth to process the most critical data using the most critical tests, but exclude lower priority tests and data from analysis. The middle level module can also selectively store data in a HDD for later analysis. In this manner, the middle level module can analyze certain data and perform certain tests at or approaching real time speed, but allow analysis of other data at a later time, or not at all.

A low level module, for example, can include a lower level of demultiplexing (or no demultiplexing) and can include, a lower processing bandwidth than the middle level module. For example, the low level module can simply stream data to a HDD for later analysis. The low level module can store all data related to a particular link and analyze the network data when the analysis processors used for the middle and high level modules are no longer needed to analyze data at their higher level of concern. Thus, many different combinations of any of the aspects of the present invention can be combined into modules that provide different levels of analysis in an overall analysis scheme or system.

The present invention may be embodied in other specific forms without departing from its spirit or essential characteristics. Combinations of different aspects of the present invention such as, but not limited to demultiplexing of network data so that the network data can be sorted between and analyzed by multiple analysis processors, distributing a piece of network data across multiple processors for network analysis, intelligently filtering network data so as to reduce the amount of processing power required by excluding network data such as repetitive data or data with known analysis results from further analysis, intelligently prioritizing different data analysis tests and algorithms so that less critical tests, tests that have already been conducted, and/or tests with known results can be excluded for the sake of more critical tests, and scaling various aspects of the present invention so as to remove bottlenecks in network analysis apparatuses can be embodied in various configurations, sequences, and combinations.

At least a portion of some of the embodiments of the present invention may comprise a special purpose or general-purpose computer, processor, or logic device including various computer hardware and devices, as discussed in greater detail herein. Embodiments within the scope of the present invention can also include computer-readable media for carrying or having computer-executable instructions or data structures stored thereon. Such computer-readable media can be any available media that can be accessed by a general purpose or special purpose computer, processor or logic device. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose computer, special purpose computer, or other logic device. When information is transferred or provided over a network or another communication connection (either hardwired, wireless, or a combination of hardwired or wireless) to a computer, the computer properly views the connection as a computer-readable medium. Thus, any such connection is properly termed a computer-readable medium. Various combinations of the above should also be included within the scope of computer-readable media. Computer-executable instructions comprise, for example, instructions, logic, and data which cause a general purpose computer, special purpose computer or special purpose processing device to perform a certain function or group of functions.

Combinations of these and other aspects of the present invention are also encompassed within the scope of following disclosure, including the claims that follow. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A network analyzer for analyzing data transferred in a network, the network analyzer comprising:
    a network processor configured to receive network data representing at least a portion of a data stream transferred in a network link, wherein the network processor prepares the network data for analysis and associates an identifier with one or more portions of the network data, wherein the network processor is an integrated unit within which the following are contained:
        a parser for extracting network data identification information from the network data;
        a transaction look-up-table (LUT) storing identifiers including transaction identification information;
        a transaction LUT manager for querying the transaction LUT and assigning a transaction identification (TID) to the network data;
        a path LUT for storing path data associating a path with the TID; and
        a path manager configured to receive the TID, query the path LUT, and transmit a path control signal to the distribution module based on the results of the path LUT query;
    a distribution module that is separate from the network processor and is coupled to the network processor and configured to receive the network data from the network processor, the distribution module configured to route the network data to at least one of a plurality of distribution module outputs based on the identifier of the one or more portions of the network data or based on said path control signal generated by the network processor; and
    a plurality of analysis processors coupled to the distribution module, each analysis processor coupled to a different output of the distribution module for receiving the network data from a different output of the distribution module, each analysis processor performing analysis specific portions of the network data, wherein:

the plurality of analysis processors analyze the network data for errors located in at least one of a physical layer, a packet layer, a command layer, an apparatus layer, and a network layer;

the same transactions are distributed to more than one of the plurality of analysis processors, and wherein analysis information is used to distribute the analysis processing burden between the analysis processors analyzing the same portions of the network data, and each analysis processor receiving the same portions of the network data perform different network analysis tests on the same portions of the network data.

2. The network analyzer of claim 1, wherein the distribution module is a router chip compliant with SPI4.2.

3. The network analyzer of claim 1, wherein the distribution module is one of a demultiplexer or a field programmable gate array.

4. The network analyzer of claim 1, wherein the network processor interleaves the identifier or other control data including a timestamp with the one or more portions of the network data.

5. The network analyzer of claim 1, further comprising a front-end field programmable gate array connected between the network link and the network processor, the front-end field programmable gate array configured to prepare the network data for the network processor by interleaving timestamp data with the network data.

6. The network analyzer of claim 1, wherein the one or more portions of the network data are analyzed at real-time speed.

7. The network analyzer of claim 1, further comprising a plurality of memory buffers connected between each output of the distribution module and the plurality of analysis processors, wherein the network processor receives a memory buffer status signal from each memory buffer and provides the path control signal based on the status signal received from each memory buffer.

8. The network analyzer of claim 1, wherein at least one of the plurality of analysis processors is coupled to another analysis processor to share information.

9. The network analyzer of claim 1, wherein each analysis processor conducts at least one of tests to verify the network data header structure, tests to verify header content, tests to verify protocol payload, tests to verify protocol structure, tests to verify primitive handshake data, and tests to verify initialization sequence.

10. The network analyzer of claim 1, wherein the path control signal includes instructions to the distribution module for routing portions of the network data belonging to the same transaction to specific analysis processors in the plurality of analysis processors.

11. The network analyzer of claim 1, wherein the network analyzer further comprises:
   a graphical display for presenting a result of the analysis to a user; and/or
   memory for storing a result of the analysis.

12. A method for analyzing network data in a network analysis system, the method comprising the following acts:
   receiving network data representing at least a portion of a data stream transmitted in a network link at a network processor;
   extracting identification information from the network data with the network processor;
   assigning the network data to a plurality of analysis processors by including an identifier in one or more portions of the network data;
   routing by a distribution module the network data to the assigned analysis processor for analysis such that each portion of the network data with the same identifier is routed to the same analysis processor, wherein the same network data is routed to multiple analysis processors for different analysis tests between the plurality of analysis processors, wherein analysis information is used to distribute the analysis processing burden between the analysis processors analyzing the same portions of the network data, wherein the different analysis tests comprise at least one of tests to verify the network data header structure, tests to verify header content, tests to verify protocol payload, tests to verify protocol structure, tests to verify primitive handshake data, and tests to verify initialization sequence; and
   at each analysis processor, analyzing the same network data for the different analysis tests, wherein the network processor is an integrated unit within which the following are contained:
      a parser for extracting network data identification information from the network data;
      a transaction look-up-table (LUT) storing identifiers including transaction identification information;
      a transaction LUT manager for querying the transaction LUT and assigning a transaction identification (TID) to the network data;
      a path LUT for storing path data associating a path with the TID; and
      a path manager configured to receive the TID, query the path LUT, and transmit a path control signal to the distribution module based on the results of the path LUT query; and
   wherein the network processor and the distribution module are separate; and
   wherein the plurality of analysis processors are coupled to the distribution module, each analysis processor coupled to a different output of the distribution module for receiving the network data from a different output of the distribution module, each analysis processor performing analysis specific portions of the network data,
   wherein: the plurality of analysis processors analyze the network data for errors located in at least one of a physical layer, a packet layer, a command layer, an apparatus layer, and a network layer.

13. The method of claim 12, wherein the analysis of the network data is conducted at real-time speed.

14. The method of claim 12, further comprising the act of determining that a channel is not functioning properly and routing the network data to a different analysis processor based on this determination.

15. The method of claim 12, further comprising receiving at least one memory buffer status signal from one or more memory buffers, wherein the network data is routed to the plurality of analysis processors based at least in part on the at least one memory buffer status signal received from the one or more memory buffers.

16. The method of claim 12, further comprising distributing the processing burden of analyzing the network data between at least two of the plurality of analysis processors.

17. The method of claim 12, further comprising providing communication between at least two of the plurality of analysis processors so as to coordinate different analysis tests conducted between at the least two analysis processors on the same network data.

* * * * *